US009856809B2

United States Patent
Nogi et al.

(10) Patent No.: US 9,856,809 B2
(45) Date of Patent: Jan. 2, 2018

(54) EXHAUST PURIFICATION DEVICE FOR INTERNAL COMBUSTION ENGINE

(71) Applicants: Yoshito Nogi, Susono (JP); Yusuke Nozaki, Gotenba (JP); Yuki Haba, Mishima (JP)

(72) Inventors: Yoshito Nogi, Susono (JP); Yusuke Nozaki, Gotenba (JP); Yuki Haba, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 14/784,236

(22) PCT Filed: Apr. 30, 2013

(86) PCT No.: PCT/JP2013/062612
§ 371 (c)(1),
(2) Date: Oct. 13, 2015

(87) PCT Pub. No.: WO2014/178110
PCT Pub. Date: Nov. 6, 2014

(65) Prior Publication Data
US 2016/0108839 A1    Apr. 21, 2016

(51) Int. Cl.
*F01N 3/00* (2006.01)
*F02D 41/02* (2006.01)
(Continued)

(52) U.S. Cl.
CPC ....... *F02D 41/0245* (2013.01); *F01N 3/0814* (2013.01); *F01N 3/0842* (2013.01);
(Continued)

(58) Field of Classification Search
CPC .... F01N 11/002; F01N 3/0814; F01N 3/0842; F01N 3/0871; F01N 3/2066; F01N 3/36; F02D 41/0245
See application file for complete search history.

(56) References Cited

U.S. PATENT DOCUMENTS 7,332,135 B2 *   2/2008   Gandhi .............. B01D 53/8631
                                                         422/171
7,703,275 B2 *   4/2010   Asanuma ............. F01N 3/0814
                                                          60/286
(Continued)

FOREIGN PATENT DOCUMENTS

JP          4868096 B2    2/2012
JP       EP 2460998 A1 *  6/2012    ........... F01N 3/0821

*Primary Examiner* — Phutthiwat Wongwian
*Assistant Examiner* — Matthew T Largi
(74) *Attorney, Agent, or Firm* — Oliff PLC

(57) ABSTRACT

In an internal combustion engine, an exhaust purification catalyst and a hydrocarbon feed valve are arranged in an exhaust passage. When a temperature of the exhaust purification catalyst falls in a first catalyst temperature region (I), a first $NO_X$ purification method is performed, while when a temperature of the exhaust purification catalyst falls in a second catalyst temperature region (II), a second $NO_X$ purification method is performed. When the temperature of the exhaust purification catalyst falls in a region (IIP) in the second catalyst temperature region close to the first catalyst temperature region, the temperature of the exhaust purification catalyst is made to increase to shift the region in which the temperature of the exhaust purification catalyst falls to the first catalyst temperature region to thereby switch the $NO_X$ purification method used from the second $NO_X$ purification method to the first $NO_X$ purification method.

14 Claims, 22 Drawing Sheets

(51) Int. Cl.
*F01N 3/36* (2006.01)
*F01N 3/08* (2006.01)
*F01N 11/00* (2006.01)
*F01N 3/20* (2006.01)

(52) U.S. Cl.
CPC ......... *F01N 3/0871* (2013.01); *F01N 3/2066* (2013.01); *F01N 3/36* (2013.01); *F01N 11/002* (2013.01); *F01N 2550/02* (2013.01); *F01N 2610/03* (2013.01); *F01N 2900/1602* (2013.01); *Y02T 10/47* (2013.01)

(56) References Cited

U.S. PATENT DOCUMENTS

| | | | |
|---|---|---|---|
| 2004/0050037 A1* | 3/2004 | Betta | B01D 53/9431 60/286 |
| 2005/0124459 A1* | 6/2005 | Ito | B60W 10/06 477/43 |
| 2012/0124971 A1 | 5/2012 | Bisaiji et al. | |

* cited by examiner

EXHAUST PURIFICATION DEVICE FOR INTERNAL COMBUSTION ENGINE

TECHNICAL FIELD

The present invention relates to an exhaust purification system for an internal combustion engine.

BACKGROUND ART

An exhaust purification system for an internal combustion engine is known in the art, in which an exhaust purification catalyst is arranged in an engine exhaust passage and a hydrocarbon feed valve is arranged upstream of the exhaust purification catalyst in the engine exhaust passage, wherein a precious metal catalyst is carried on an exhaust gas flow surface of the exhaust purification catalyst and basic exhaust gas flow surface parts are formed around the precious metal catalyst, wherein the exhaust purification catalyst has the property of reducing the $NO_X$ contained in exhaust gas if a concentration of hydrocarbons flowing into the exhaust purification catalyst is made to vibrate at within a predetermined range of amplitude and with a period within a predetermined range of period and has the property of a storage amount of $NO_X$ contained in exhaust gas increasing if a vibration period of the hydrocarbon concentration is made longer than the predetermined range of period, and wherein a first $NO_X$ purification method configured to inject hydrocarbons from the hydrocarbon feed valve with a period within the predetermined range of period to thereby purify the $NO_X$ contained in the exhaust gas and a second $NO_X$ purification method configured to make an air-fuel ratio of exhaust gas flowing into the exhaust purification catalyst rich with a period longer than the predetermined range of period to thereby make the exhaust purification catalyst release the stored $NO_X$ to purify the $NO_X$ are selectively used (for example, see PTL 1). In this exhaust purification system, when a temperature of the exhaust purification catalyst is lower than a limit temperature, the second $NO_X$ purification method is used, while when the temperature of the exhaust purification catalyst is higher than the limit temperature, the first $NO_X$ purification method is used. Further, in the second $NO_X$ purification method, rich control configured to inject additional fuel in addition to fuel for combustion in a combustion chamber to make the air-fuel ratio of the exhaust gas flowing into the exhaust purification catalyst rich, is performed in order to purify $NO_X$.

CITATIONS LIST

Patent Literature

PTL 1: Japanese Patent No. 4868096B

SUMMARY OF INVENTION

Technical Problem

However, for example, if performing rich control when an engine load is considerably low or when an engine speed is considerably low, misfire may occur. If performing rich control when the engine load is considerably high or when the engine speed is considerably high, a large amount of smoke may be discharged. For this reason, in such engine operating states, rich control is not performed. As a result, in a case where the second $NO_X$ purification method is used due to the temperature of the exhaust purification catalyst being lower than the limit temperature, if rich control is not performed over a long period of time, the exhaust purification catalyst cannot be made to release the stored $NO_X$ and the $NO_X$ cannot be purified well.

In other words, even if following certain judgment criteria to decide whether to use the first NO purification method or to use the second $NO_X$ purification method, it is not necessarily possible to purify the NO well.

An object of the present invention is to provide an exhaust purification system for an internal combustion engine which can more reliably purify $NO_X$.

Solution to Problem

According to the present invention, there is provided an exhaust purification system for an internal combustion engine, in which an exhaust purification catalyst is arranged in an engine exhaust passage and a hydrocarbon feed valve is arranged upstream of the exhaust purification catalyst in the engine exhaust passage, wherein a precious metal catalyst is carried on an exhaust gas flow surface of the exhaust purification catalyst and basic exhaust gas flow surface parts are formed around the precious metal catalyst, wherein the exhaust purification catalyst has the property of reducing the $NO_X$ contained in exhaust gas if a concentration of hydrocarbons flowing into the exhaust purification catalyst is made to vibrate at an amplitude within a predetermined range of amplitude and with a period within a predetermined range of period and has the property of a storage amount of $NO_X$ contained in exhaust gas increasing if a vibration period of the hydrocarbon concentration is made longer than the predetermined range of period, and wherein a first $NO_X$ purification method configured to inject hydrocarbons from the hydrocarbon feed valve with a period within the predetermined range of period to thereby purify the $NO_X$ contained in the exhaust gas and a second $NO_X$ purification method configured to make an air-fuel ratio of exhaust gas flowing into the exhaust purification catalyst rich with a period longer than the predetermined range of period to thereby make the exhaust purification catalyst release the stored $NO_X$ to purify the $NO_X$ are selectively used, characterized in that a first catalyst state region and a second catalyst state region are defined in a region in which an exhaust purification catalyst state can fall, that the first $NO_X$ purification method is used when the exhaust purification catalyst state falls in the first catalyst state region and the second $NO_X$ purification method is used when the exhaust purification catalyst state falls in the second catalyst state region, that the first catalyst state region and the second catalyst state region are respectively divided into proximal regions close to the other catalyst state regions and distal regions far from the other catalyst state regions, and that, when the exhaust purification catalyst state falls in the proximal region of one catalyst state region, shift control configured to shift the region in which the exhaust purification catalyst state falls to the other catalyst state region is performed, to thereby switch the $NO_X$ purification method used from the first $NO_X$ purification method to the second $NO_X$ purification method or from the second $NO_X$ purification method to the first $NO_X$ purification method.

Advantageous Effects of Invention $NO_X$ can be more reliably purified.

DESCRIPTION OF EMBODIMENTS

Figure 1:
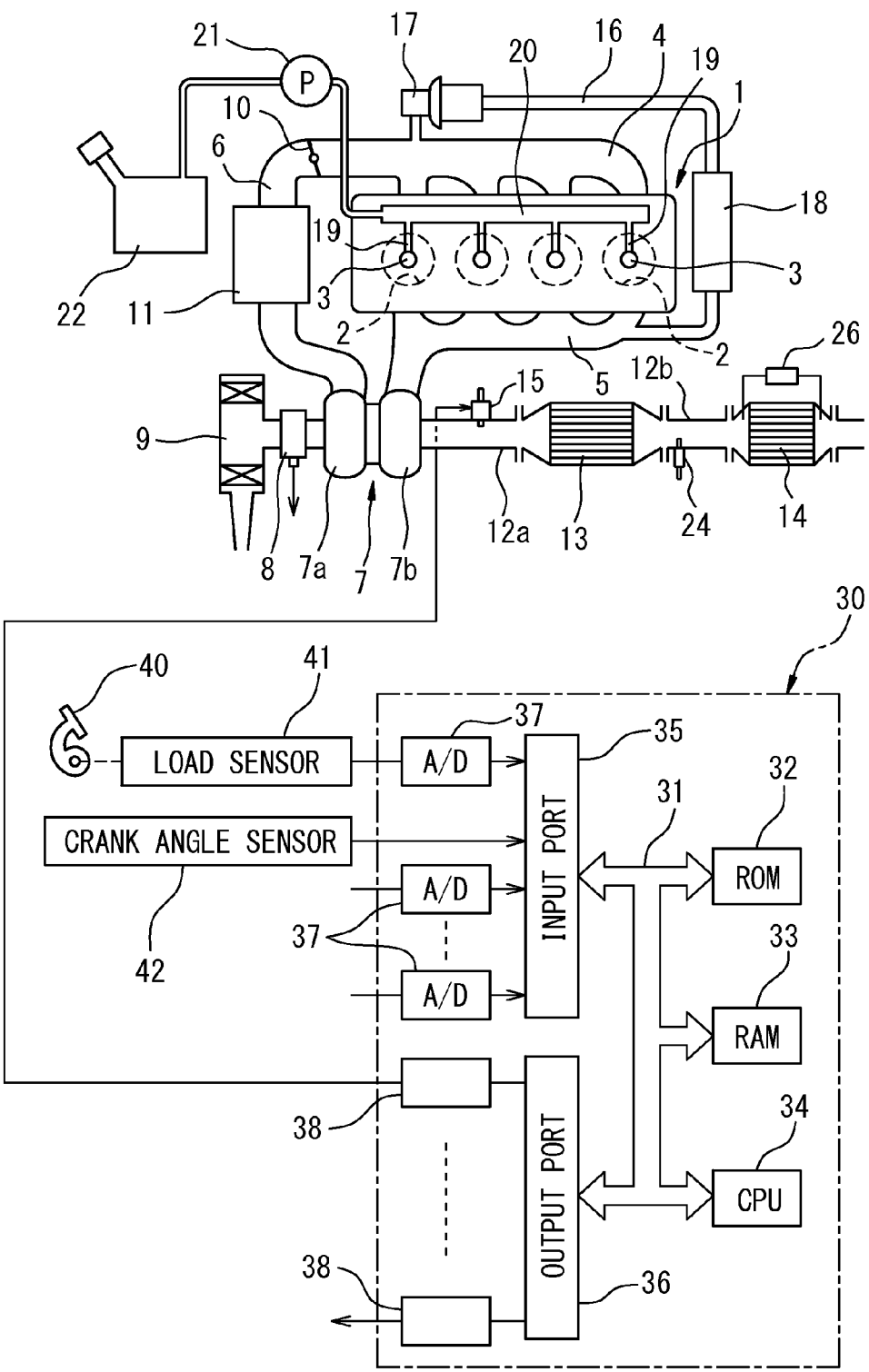
FIG. 1 is an overall view of a compression ignition type of internal combustion engine.

FIG. 1 is an overall view of a compression ignition type internal combustion engine. Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air detector 8 to an air cleaner 9. Inside the intake duct 6, a throttle valve 10 which is driven by an actuator is arranged. Around the intake duct 6, a cooling device 11 is arranged for cooling an intake air which flows through the inside of the intake duct 6. In the embodiment which is shown in FIG. 1, an engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12a to an inlet of an exhaust purification catalyst 13. In the embodiment according to the present invention, this exhaust purification catalyst 13 is comprised of an $NO_X$ storage catalyst. An outlet of the exhaust purification catalyst 13 is connected through an exhaust pipe 12 to a particulate filter 14. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which combustion is carried out under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling an EGR gas which flows through the inside of the EGR passage 16. In the embodiment which is shown in FIG. 1, the engine cooling water is guided to the inside of the cooling device 18 where the engine cooling water is used to cool the EGR gas. Each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with components connected with each other by a bidirectional bus 31 such as a ROM (read only memory) 32, a RAM (random access memory) 33, a CPU (microprocessor) 34, an input port 35, and an output port 36. Downstream of the exhaust purification catalyst 13 in the exhaust pipe 12b, a temperature sensor 24 is arranged for detecting a temperature of an exhaust gas which flows out from the exhaust purification catalyst 13. The temperature of the exhaust gas which is detected by the temperature sensor 24 expresses a temperature of the exhaust purification catalyst 13. Further, a differential pressure sensor 26 is attached to the particulate filter 14 for detecting a differential pressure across the particulate filter 14. Output signals of the temperature sensor 24, differential pressure sensor 26, and intake air detector 8 are input through respectively corresponding AD converters 37 to the input port 35. Further, a load sensor 41 is connected to an accelerator pedal 40, which generates an output voltage proportional to the amount of depression L of the accelerator pedal 40. An output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

Figure 2:
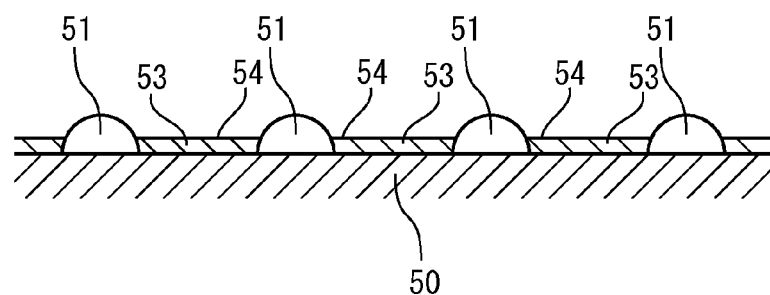
FIG. 2 is a view schematically showing a surface part of a catalyst carrier.

FIG. 2 schematically shows a surface part of a catalyst carrier which is carried on a substrate of the exhaust purification catalyst 13 which is shown in FIG. 1. In this exhaust purification catalyst 13, as shown in FIG. 2, a precious metal catalyst 51 is carried on a catalyst carrier 50 made of, for example, alumina. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. This basic layer 53 is made to contain ceria $CeO_2$. Therefore, the exhaust purification catalyst 13 has an oxygen storage ability. Further, the catalyst carrier 50 of the exhaust purification catalyst 13 can carry not only platinum Pt, but only rhodium Rh or palladium Pd. Note that the exhaust gas flows along the top of the catalyst carrier 50, so the precious metal catalyst 51 can be said to be carried on an exhaust gas flow surface of the exhaust purification catalyst 13. Further, a surface of the basic layer 53 exhibits basicity, so the surface of the basic layer 53 is referred to as a "basic exhaust gas flow surface parts 54".

Figure 3:
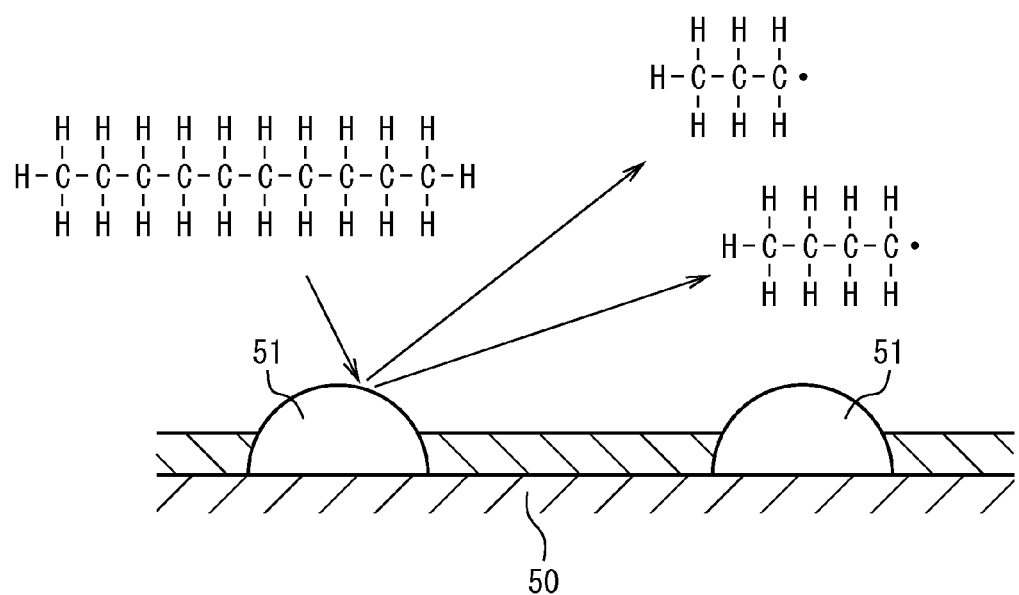
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, the reformed hydrocarbons at this time are used to purify the $NO_X$ at the exhaust purification catalyst 13. FIG. 3 schematically shows a reformation action performed at the exhaust purification catalyst 13 at this time. As shown in FIG. 3, the hydrocarbons HC which are injected from the hydrocarbon feed valve 15 are converted to radical hydrocarbons HC with less carbon atoms due to the precious metal catalyst 51.

Figure 4:
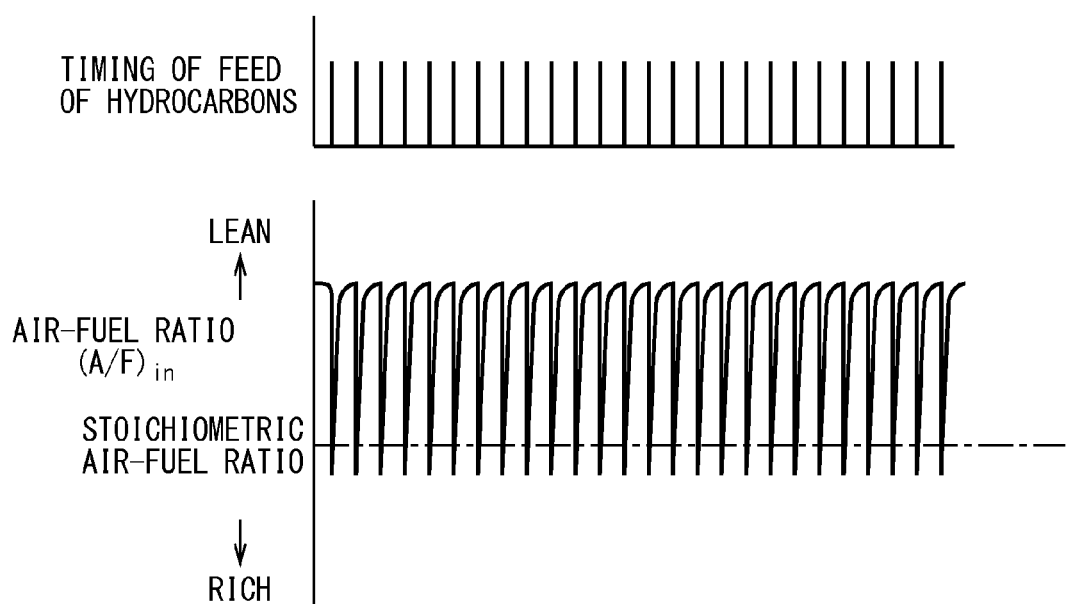
FIG. 4 is a view which shows a change of an air-fuel ratio of exhaust gas which flows into an exhaust purification catalyst.

FIG. 4 shows a feed timing of hydrocarbons from the hydrocarbon feed valve 15 and a change in an air-fuel ratio (A/F) in of the exhaust gas which flows into the exhaust purification catalyst 13. Note that the change in the air-fuel ratio (A/F) in depends on a change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
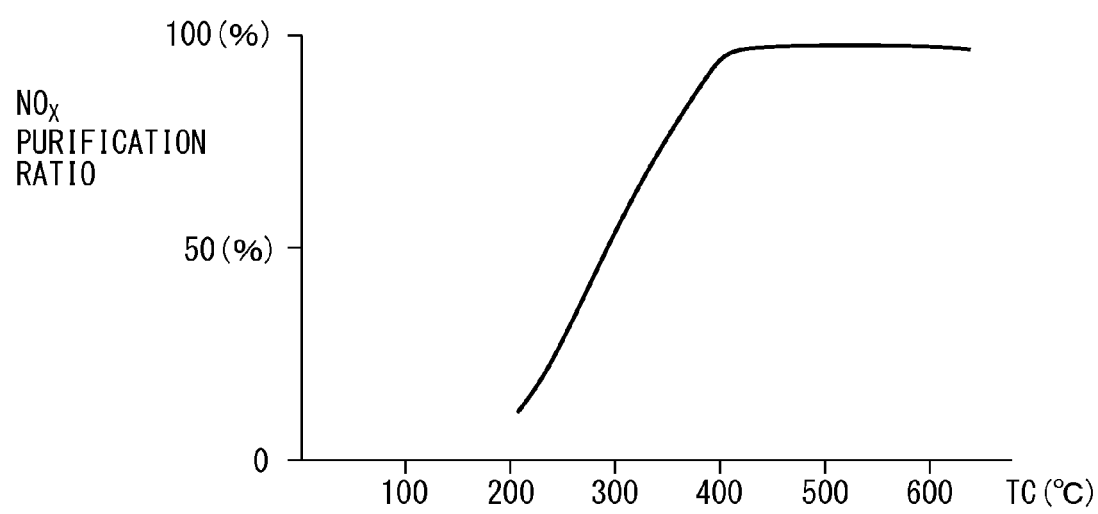
FIG. 5 is a view which shows an $NO_X$ purification ratio.

FIG. 5 shows an $NO_X$ purification ratio by the exhaust purification catalyst 13 with respect to a catalyst temperatures TC of the exhaust purification catalyst 13 when making the concentration of hydrocarbons which flow into the exhaust purification catalyst 13 change periodically so as to, as shown in FIG. 4, make the air-fuel ratio (A/F) in of the exhaust gas flowing to the exhaust purification catalyst 13 change periodically. As a result of extensive research relating to $NO_X$ purification for a long time, it has been found that if making the concentration of hydrocarbons which flow into the exhaust purification catalyst 13 "vibrate" at an amplitude within a predetermined range of amplitude and with a period within a predetermined range of period, as shown in FIG. 5, an extremely high $NO_X$ purification ratio is obtained even in a high temperature region in which the temperature is 400° C. or higher.

Figure 6A:
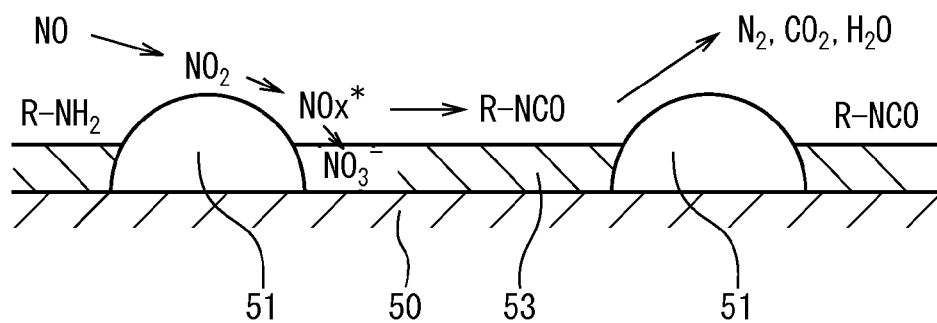
FIG. 6A and FIG. 6B are views for explaining an oxidation and reduction reaction in an exhaust purification catalyst.
Figure 6B:
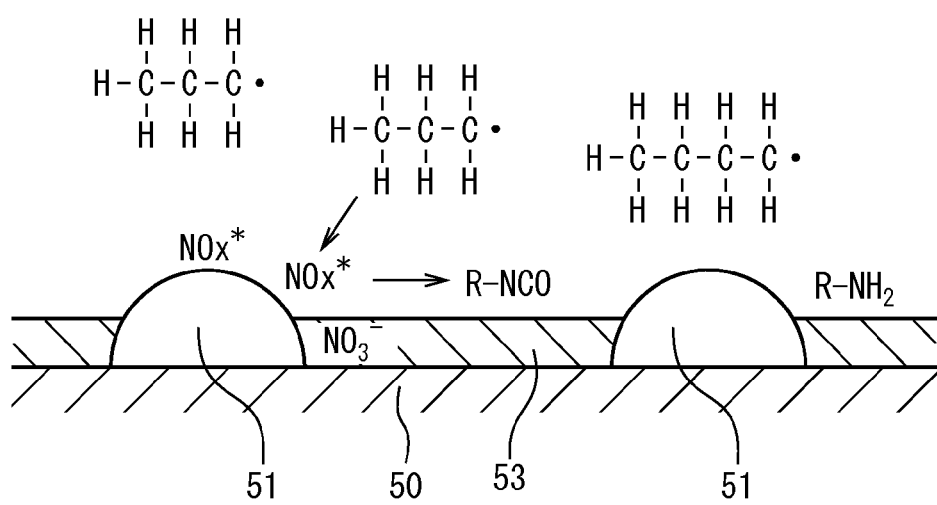

Furthermore, it has been found that, at this time, a large amount of reducible intermediates including nitrogen and hydrocarbons continues to be held or adsorbed on the surface of the basic layer 53, that is, on the basic exhaust gas flow surface parts 54 of the exhaust purification catalyst 13, and that the reducible intermediates play a central role in obtaining a high $NO_X$ purification ratio. Next, this will be explained with reference to FIGS. 6A and 6B. Note that these FIGS. 6A and 6B schematically show the surface part of the catalyst carrier 50 of the exhaust purification catalyst 13. These FIGS. 6A and 6B show reactions presumed to occur when the concentration of hydrocarbons which flow into the exhaust purification catalyst 13 is made to vibrate at an amplitude within a predetermined range of amplitude and with a period within a predetermined range of period.

FIG. 6A shows a case when the concentration of hydrocarbons which flow into the exhaust purification catalyst 13 is low, while FIG. 6B shows a case when hydrocarbons are fed from the hydrocarbon feed valve 15 and the air-fuel ratio (A/F) in of the exhaust gas which flows into the exhaust purification catalyst 13 is made rich, that is, the concentration of hydrocarbons which flow into the exhaust purification catalyst 13 is made higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 is normally in a state of oxygen excess. At this time, part of the NO which is contained in the exhaust gas adheres to the exhaust purification catalyst 13, while part of the NO which is contained in the exhaust gas, as shown in FIG. 6A, is oxidized on the platinum 51 and is converted to $NO_2$. Next, this $NO_2$ is further oxidized and is converted to $NO_3$. Further, part of the $NO_2$ is converted to $NO_2^-$. Therefore, on the platinum Pt 51, $NO_2^-$ and $NO_3$ are produced. The $NO_X$ which adheres to the exhaust purification catalyst 13 and the $NO_2^-$ and $NO_3$ which are formed on the platinum Pt 51 are strong in activity. Therefore, these NO, $NO_2^-$, and $NO_3$ will be referred to as "active $NO_X^*$", hereinafter.

On the other hand, if hydrocarbons are fed from the hydrocarbon feed valve 15 and the air-fuel ratio (A/F) in of the exhaust gas which flows into the exhaust purification catalyst 13 is made rich, the hydrocarbons successively adhere over the entire exhaust purification catalyst 13. The majority of the adhering hydrocarbons successively reacts with oxygen and is burned. Part of the adhering hydrocarbons are successively reformed and radicalized in the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ is higher, the active $NO_X^*$ reacts on the platinum 51 with the radical hydrocarbons HC as shown in FIG. 6B to thereby form the reducible intermediates. The reducible intermediates adhere to or are adsorbed on the surface of the basic layer 53.

Note that, at this time, the first produced reducible intermediate is considered to be a nitro compound R—$NO_2$. Once a nitro compound R—$NO_2$ is produced, it is converted to a nitrile compound R—CN, but this nitrile compound R—CN can only survive for an instant in this state, so it is immediately converted to an isocyanate compound R—NCO. This isocyanate compound R—NCO is converted to an amine compound R—$NH_2$ if hydrolyzed. However, in this case, what is hydrolyzed is considered to be part of the isocyanate compound R—NCO. Therefore, the majority of the reducible intermediates which are held or adsorbed on the surface of the basic layer 53 as shown in FIG. 6B is believed to be the isocyanate compound R—NCO and amine compound R—$NH_2$.

On the other hand, if the hydrocarbons HC adhere around the produced reducible intermediates as shown in FIG. 6B, the reducible intermediates are blocked by the hydrocarbons HC and the reaction will not proceed any further. In this case, if the concentration of hydrocarbons which flow into the exhaust purification catalyst 13 is lowered and then the hydrocarbons which adhere around the reducible intermediates are oxidized and consumed and thereby the concentration of oxygen around the reducible intermediates becomes higher, the reducible intermediates react with the $NO_X$ in the exhaust gas or the active $NO_X^*$, react with the surrounding oxygen, or break down on their own. Due to these, the reducible intermediates R—NCO and R—$NH_2$ are converted to $N_2$, $CO_2$, and $H_2O$, as shown in FIG. 6A, and therefore the $NO_X$ is purified.

In this way, in the exhaust purification catalyst 13, reducible intermediates are produced by making the concentration of hydrocarbons which flow into the exhaust purification catalyst 13 higher. When oxygen concentration increases after the concentration of hydrocarbons which flow into the exhaust purification catalyst 13 is lowered, the reducible intermediates react with the $NO_X$ in the exhaust gas or the active $NO_X^*$ or oxygen or break down on their own, and thereby the $NO_X$ is purified. That is, in order for the exhaust purification catalyst 13 to purify the $NO_X$, the concentration of hydrocarbons which flow into the exhaust purification catalyst 13 has to be periodically changed.

Of course, in this case, it is necessary to increase the hydrocarbon concentration to a concentration sufficiently high for producing the reducible intermediates and it is necessary to lower the hydrocarbon concentration to a concentration sufficiently low for making the produced reducible intermediates react with the $NO_X$ in the exhaust gas or active $NO_X^*$ or oxygen or break down on their own. That is, it is necessary to make the concentration of hydrocarbons which flow into the exhaust purification catalyst 13 vibrate at an amplitude within a predetermined range of amplitude. Note that, in this case, it is necessary to hold the produced reducible intermediates on the basic layer 53, that is, the basic exhaust gas flow surface parts 54, until the reducible intermediates R—NCO and R—$NH_2$ react with the $NO_X$ in the exhaust gas or the active $NO_X^*$ or oxygen or break down themselves. For this reason, the basic exhaust gas flow surface parts 54 are provided.

On the other hand, if lengthening a feed period of the hydrocarbons, a time period during which the oxygen concentration is higher becomes longer, in a time period from when the hydrocarbons are fed to when the hydrocarbons are next fed. Therefore, the active $NO_X^*$ is absorbed in the basic layer 53 in the form of nitrates without producing reducible intermediates. To avoid this, it is necessary to make the concentration of hydrocarbons which flow into the exhaust purification catalyst 13 vibrate with a period within a predetermined range of period.

Therefore, in the embodiment of the present invention, to make an $NO_X$ which is contained in the exhaust gas and reformed hydrocarbons react with each other to produce reducible intermediates R—NCO and R—$NH_2$ including nitrogen and hydrocarbons, the precious metal catalyst 51 is carried on the exhaust gas flow surface of the exhaust purification catalyst 13. To hold the produced reducible intermediates R—NCO and R—$NH_2$ inside the exhaust purification catalyst 13, the basic exhaust gas flow surface parts 54 are formed around the precious metal catalyst 51. The reducible intermediates R—NCO and R—$NH_2$ which are held on the basic exhaust gas flow surface parts 54 are converted to $N_2$, $CO_2$, and $H_2O$. A vibration period of the hydrocarbon concentration is made a vibration period required for continuation of a production of the reducible intermediates R—NCO and R—$NH_2$. Incidentally, in the example shown in FIG. 4, an injection interval is made 3 seconds.

Figure 7A:
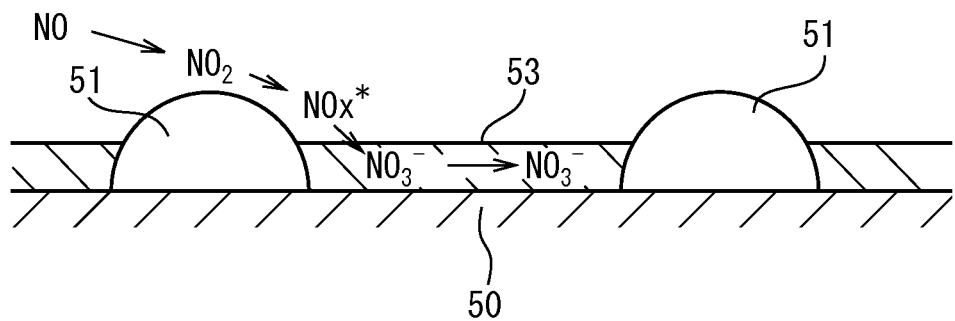
FIG. 7A and FIG. 7B are views for explaining an oxidation and reduction reaction in an exhaust purification catalyst.

If making a vibration period of the hydrocarbon concentration, that is, a vibration period of an injection of hydrocarbons HC from the hydrocarbon feed valve 15, longer than a period within the above-mentioned predetermined range of period, the reducible intermediate R—NCO or R—$NH_2$ is eliminated from the surface of the basic layer 53. At this time, the active $NO_X^*$ which is produced on the platinum Pt 53 diffuses in the form of nitric acid ions $NO_3^-$ inside the basic layer 53 and is converted to nitrates, as shown in FIG. 7A. That is, at this time, the $NO_X$ in the exhaust gas is absorbed in the form of nitrates inside the basic layer 53.

Figure 7B:
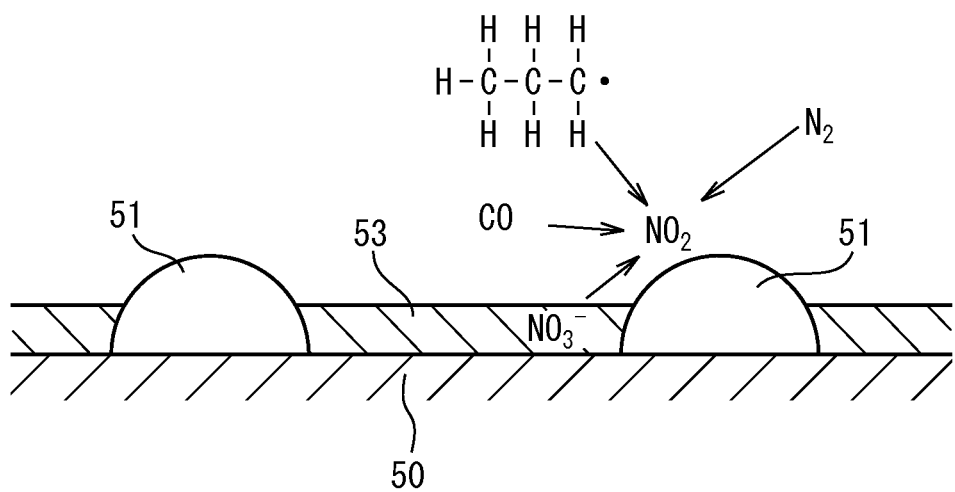

On the other hand, FIG. 7B shows a case where the air-fuel ratio of the exhaust gas which flows into the exhaust purification catalyst 13 is made the stoichiometric air-fuel ratio or rich when the $NO_X$ is absorbed in the form of nitrates inside the basic layer 53 in this way. In this case, the concentration of oxygen in the exhaust gas falls, so the reaction proceeds in the opposite direction ($NO_3^- \rightarrow NO_2$) and therefore the nitrates which are absorbed in the basic layer 53 successively are converted to nitric acid ions $NO_3^-$ and, as shown in FIG. 7B, are released in the form of $NO_2$ from the basic layer 53. The released $NO_2$ is then reduced by hydrocarbons HC and CO which are contained in the exhaust gas.

Figure 8:
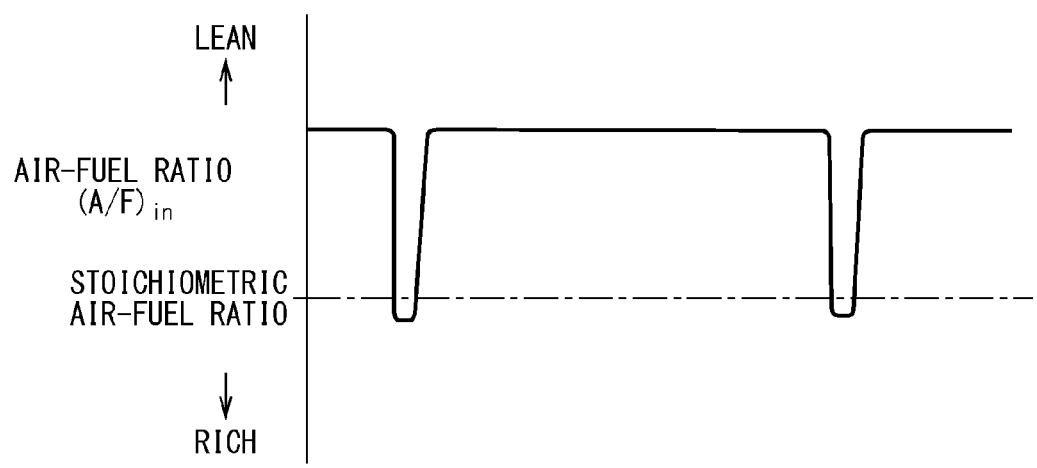
FIG. 8 is a view which shows a change of an air-fuel ratio of exhaust gas which flows into an exhaust purification catalyst.

FIG. 8 shows a case where an air-fuel ratio (A/F) in of the exhaust gas which flows into the basic layer 53 exhaust purification catalyst 13 temporarily rich slightly before an $NO_X$ absorption ability becomes saturated. Note that, in the example which is shown in FIG. 8, a time interval of this rich control is 1 minute or more. In this case, the $NO_X$ which is stored in the basic layer 53 when the air-fuel ratio (A/F) in of the exhaust gas is lean is released all at once from the basic layer 53 and reduced when the air-fuel ratio (A/F) in of the exhaust gas is temporarily made rich. Therefore, in this case, the basic layer 53 performs the role of an absorbent for temporarily absorbing $NO_X$.

Note that, at this time, sometimes the basic layer 53 temporarily adsorbs the $NO_X$. Therefore, if using the term of "storage" as a term including both absorption and adsorption, at this time, the basic layer 53 performs the role of an $NO_X$ storage agent for temporarily storing $NO_X$. That is, in this case, if referring to a ratio of an air and fuel (hydrocarbons) which are fed to the engine intake passage, combustion chamber 2, and exhaust passage upstream of the exhaust purification catalyst 13 as an "air-fuel ratio of the exhaust gas", the exhaust purification catalyst 13 functions as an $NO_X$ storage catalyst which stores $NO_X$ when the air-fuel ratio of the exhaust gas is lean and releases the stored $NO_X$ when a concentration of oxygen in the exhaust gas falls.

Figure 9:
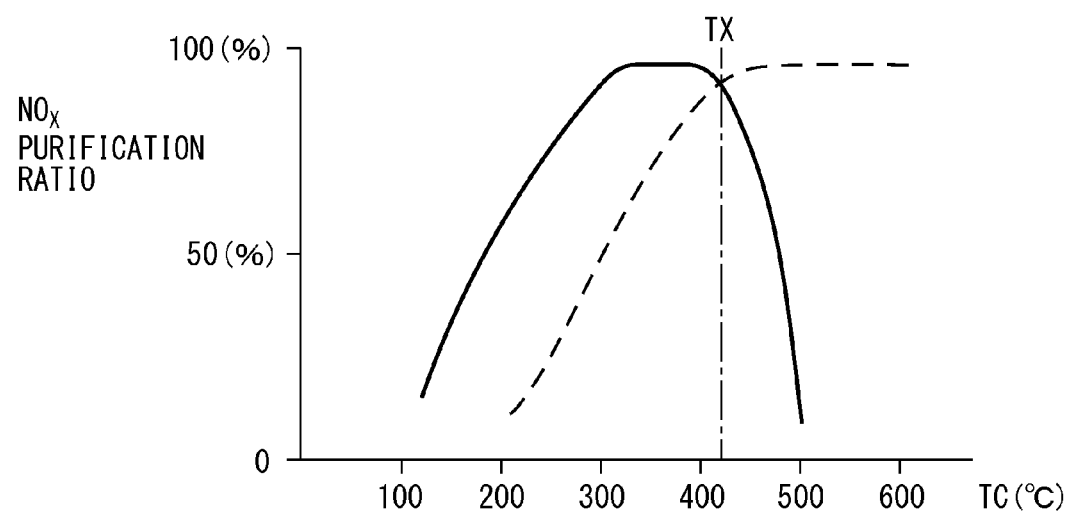
FIG. 9 is a view which shows an $NO_X$ purification ratio.

The solid line in FIG. 9 shows an $NO_X$ purification ratio when making the exhaust purification catalyst 13 function as an $NO_X$ storage catalyst in this way. Note that, in FIG. 9, the abscissa indicates the catalyst temperature TC of the exhaust purification catalyst 13. If making the exhaust purification catalyst 13 function as an $NO_X$ storage catalyst in this way, as shown in FIG. 9 by the solid line, an extremely high $NO_X$ purification ratio is obtained when the catalyst temperature TC is from 300° C. to 400° C., but the $NO_X$ purification ratio falls if the catalyst temperature TC is a high temperature of 400° C. or more. Note that FIG. 9 shows the $NO_X$ purification ratio which is shown in FIG. 5 by a broken line.

The reason why the $NO_X$ purification ratio falls in this way if the catalyst temperature TC becomes 400° C. or more is that, if the catalyst temperature TC becomes 400° C. or more, the nitrates are thermally decomposed and are released in the form of $NO_2$ from the exhaust purification catalyst 13. That is, so long as storing an $NO_X$ in the form of nitrates, it is difficult to obtain a high $NO_X$ purification ratio when the catalyst temperature TC is high. However, in the new $NO_X$ purification method which is shown from FIG. 4 to FIG. 6B, nitrates are not produced or even if produced are very small in amount, as will be understood from FIGS. 6A and 6B. Therefore, as shown in FIG. 5, even when the catalyst temperature TC is high, a high $NO_X$ purification ratio is obtained.

In the embodiment according to the present invention, to enable this new $NO_X$ purification method to be used to purify an $NO_X$, a hydrocarbon feed valve 15 for feeding hydrocarbons is arranged in the engine exhaust passage, an exhaust purification catalyst 13 is arranged downstream of the hydrocarbon feed valve 15 in the engine exhaust passage, a precious metal catalyst 51 is carried on an exhaust gas flow surface of the exhaust purification catalyst 13 and a basic exhaust gas flow surface part 54 is formed around the precious metal catalyst 51, the exhaust purification catalyst 13 has the property of reducing $NO_X$ which is contained in exhaust gas if a concentration of hydrocarbons which flow into the exhaust purification catalyst 13 is made to vibrate at an amplitude within a predetermined range of amplitude and with a period within a predetermined range of period and has the property of a storage amount of $NO_X$ which is contained in exhaust gas increasing if a vibration period of the hydrocarbon concentration is made longer than this predetermined range of period, and hydrocarbons are injected from the hydrocarbon feed valve 15 with a period within the predetermined range of period at the time of engine operation to thereby reduce the $NO_X$ which is contained in the exhaust gas at the exhaust purification catalyst 13.

That is, the $NO_X$ purification method which is shown from FIG. 4 to FIG. 6B can be said to be a new $NO_X$ purification method which is designed to purify $NO_X$ without forming almost any nitrates at all when using an exhaust purification catalyst in which a precious metal catalyst is carried and a basic layer which can absorb $NO_X$ is formed. In actuality, an amount of nitrates which are detected from the basic layer 53 is extremely small when using this new $NO_X$ purification method, compared with when making the exhaust purification catalyst 13 function as an $NO_X$ storage catalyst. Note that this new $NO_X$ purification method will be referred to as a first $NO_X$ purification method, hereinafter.

Figure 10:
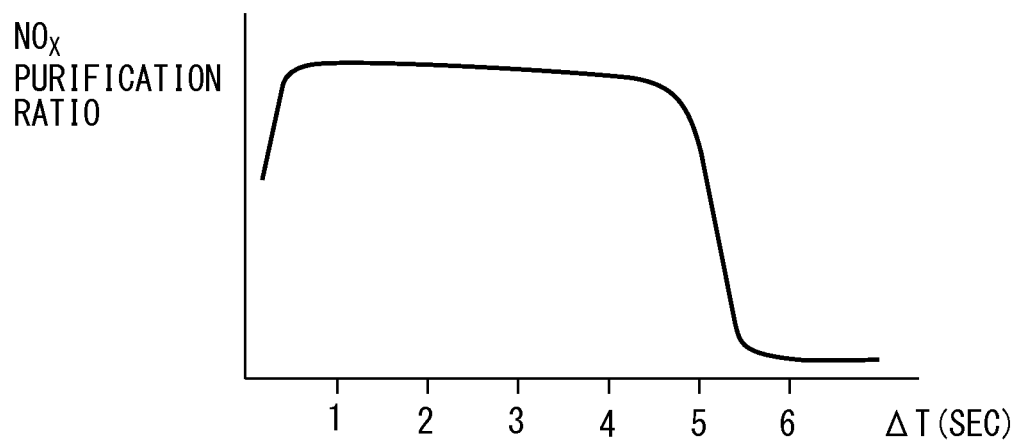
FIG. 10 is a view which shows a relationship between an injection period ΔT of hydrocarbons and an $NO_X$ purification ratio.

Now, as explained above, if the injection period ΔT of the hydrocarbon from the hydrocarbon feed valve 15 is longer, a time period where the oxygen concentration around the active $NO_X^*$ is higher becomes longer, in a time period from when the hydrocarbons are injected to when the hydrocarbons are next injected. In this case, in the embodiment which is shown in FIG. 1, if the injection period ΔT of the hydrocarbons becomes longer than about 5 seconds, the active $NO_X^*$ starts to be absorbed in the form of nitrates inside the basic layer 53. Therefore, as shown in FIG. 10, if the injection period ΔT of the hydrocarbons becomes longer than about 5 seconds, the $NO_X$ purification ratio falls. Therefore, in the embodiment which is shown in FIG. 1, the injection period ΔT of the hydrocarbons has to be made 5 seconds or less.

On the other hand, in the embodiment according to the present invention, if the injection period ΔT of the hydrocarbons becomes about 0.3 second or less, the injected hydrocarbons start to deposit on the exhaust gas flow surface of the exhaust purification catalyst 13 and, therefore, as shown in FIG. 10, if the injection period ΔT of the hydrocarbons becomes about 0.3 second or less, the $NO_X$ purification ratio falls. Therefore, in the embodiment according to the present invention, the injection period of the hydrocarbons is made from 0.3 second to 5 seconds.

Figure 11:
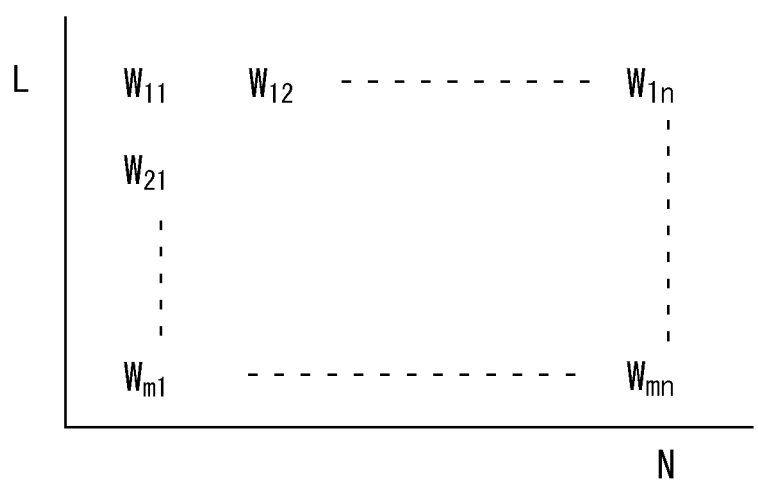
FIG. 11 is a map which shows an amount of injection of hydrocarbons.

Now, in the embodiment according to the present invention, a hydrocarbon injection amount and injection timing from the hydrocarbon feed valve 15 are made to change to control the air-fuel ratio (A/F) in of the exhaust gas which flows into the exhaust purification catalyst 13 and injection period ΔT to be optimum values corresponding to an operating state of the engine. In this case, in the embodiment according to the present invention, an optimum hydrocarbon injection amount W when the NOx purification action by the first NOx purification method is being performed is stored as a function of an amount of depression L of the accelerator pedal 40 and engine speed N in the form of a map such as shown in FIG. 11 in advance in the ROM 32. Further, an optimum injection period ΔT of the hydrocarbons at this time is also stored as a function of the amount of depression L of the accelerator pedal 40 and engine speed N in the form of a map in advance in the ROM 32.

Figure 12:
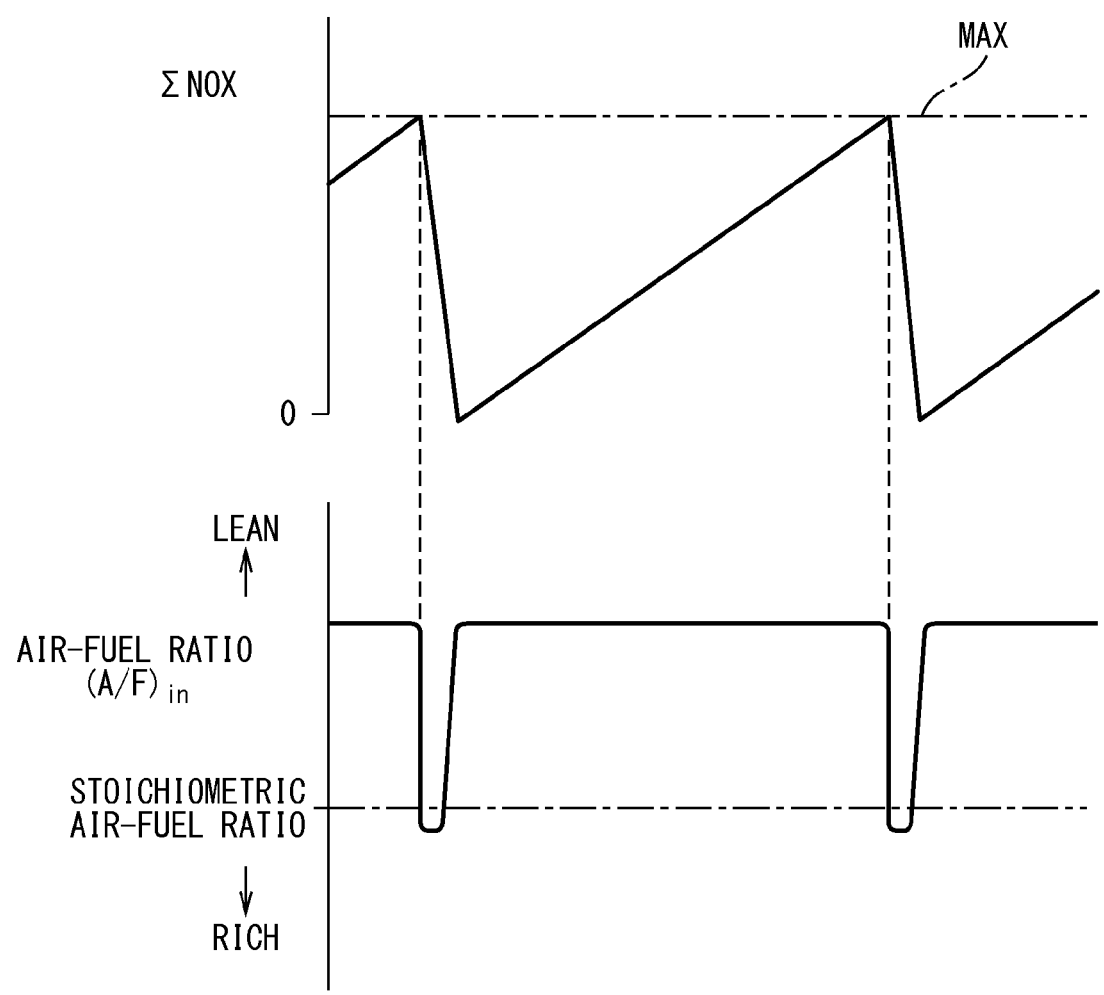
FIG. 12 is a view which shows $NO_X$ release control.
Figure 13:
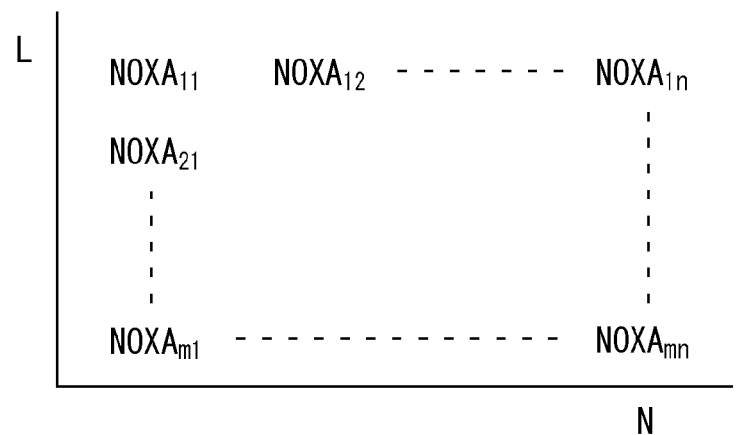
FIG. 13 is a map of a discharged $NO_X$ amount NOXA.

Next, referring to FIG. 12 to FIG. 15, the $NO_X$ purification method in a case of making the exhaust purification catalyst 13 function as an $NO_X$ storage catalyst will be specifically explained. The $NO_X$ purification method when making the exhaust purification catalyst 13 function as an $NO_X$ storage catalyst in this way will be referred to as a "second $NO_X$ purification method", hereinafter. In this second $NO_X$ purification method, as shown in FIG. 12, the air-fuel ratio (A/F) in of the exhaust gas which flows into the exhaust purification catalyst 13 is made temporarily rich when a stored $NO_X$ amount ΣNOX which is stored in the basic layer 53 exceeds a predetermined allowable amount MAX. If the air-fuel ratio (A/F) in of the exhaust gas is made rich, the $NO_X$ which was stored in the basic layer 53 when the air-fuel ratio (A/F) in of the exhaust gas was lean is released all at once from the basic layer 53 and reduced. Due to this, the $NO_X$ is purified.

The stored $NO_X$ amount ΣNOX is calculated from, for example, an amount of $NO_X$ which is discharged from the engine. In the embodiment according to the present invention, a discharged $NO_X$ amount NOXA which is discharged from the engine per unit time is stored as a function of the amount of depression L of the accelerator pedal 40 and engine speed N in the form of a map such as shown in FIG.

13 in advance inside the ROM 32. This discharged $NO_X$ amount NOXA is used to calculate the stored $NO_X$ amount $\Sigma NOX$. In this case, as explained above, a period of making the air-fuel ratio (A/F) in of the exhaust gas rich is usually 1 minute or more.

Figure 14:
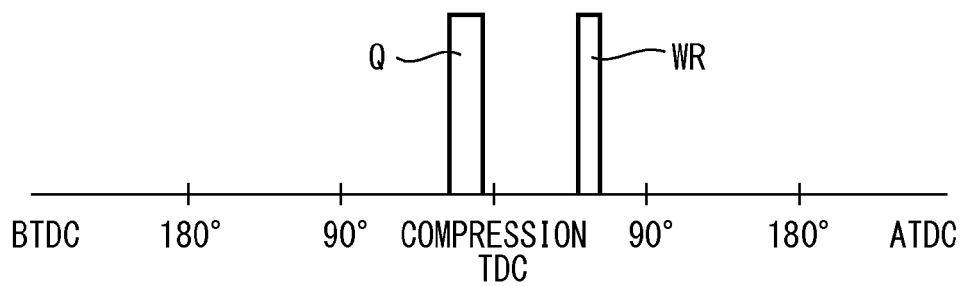
FIG. 14 is a view which shows a fuel injection timing.
Figure 15:
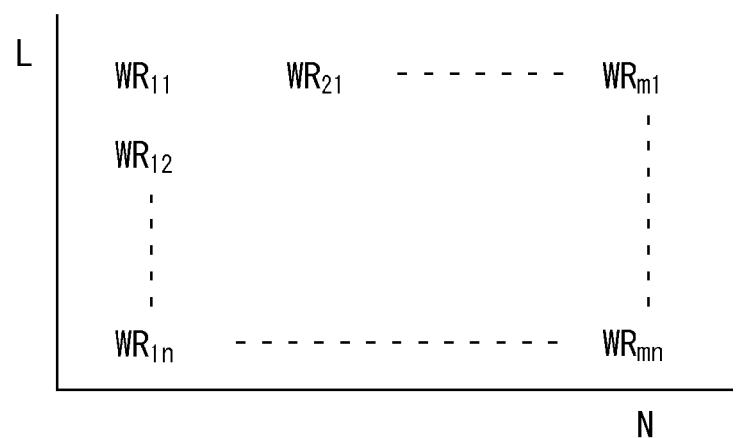
FIG. 15 is a view which shows a map of fuel feed amount WR.

In the second $NO_X$ purification method, as shown in FIG. 14, the air-fuel ratio (A/F) in of the exhaust gas which flows into the exhaust purification catalyst 13 is made rich by injecting not only fuel Q for combustion but also additional fuel WR into a combustion chamber 2 from a fuel injector 3. Note that, in FIG. 14, the abscissa shows a crank angle. This additional fuel WR is injected at a timing at which it will burn, but will not appear as engine output, that is, slightly before ATDC90° after compression top dead center. This fuel amount WR is stored as a function of the amount of depression L of the accelerator pedal 40 and the engine speed N in the form of a map such as shown in FIG. 15 in advance in the ROM 32.

In the embodiment according to the present invention, an $NO_X$ purification action by the first $NO_X$ purification method and an $NO_X$ purification action by the second $NO_X$ purification method are selectively performed. Which of the $NO_X$ purification action by the first $NO_X$ purification method and the $NO_X$ purification action by the second $NO_X$ purification method to perform is for example determined as follows. That is, the $NO_X$ purification ratio when the $NO_X$ purification action by the first $NO_X$ purification method is performed, as shown in FIG. 9 by the broken line, starts to rapidly fall when the temperature TC of the exhaust purification catalyst 13 becomes the limit temperature TX or less. As opposed to this, as shown in FIG. 9 by the solid line, the $NO_X$ purification ratio when the $NO_X$ purification action by the second $NO_X$ purification method is performed falls relatively slowly when the temperature TC of the exhaust purification catalyst 13 falls. Therefore, in the embodiment according to the present invention, the $NO_X$ purification action by the first $NO_X$ purification method is performed when the temperature TC of the exhaust purification catalyst 13 is higher than the limit temperature TX, while the $NO_X$ purification action by the second $NO_X$ purification method is performed when the temperature TC of the exhaust purification catalyst 13 is lower than the limit temperature TX.

Figure 16:
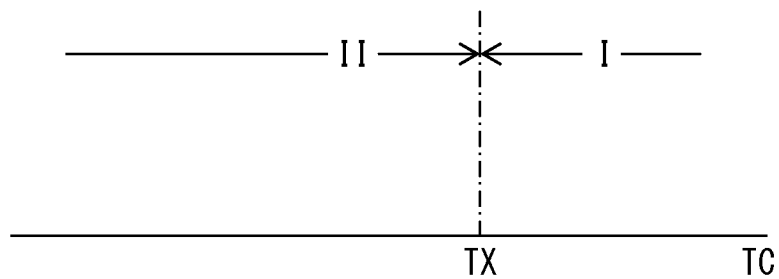
FIG. 16 is a graph showing a first catalyst state region and a second catalyst state region.

That is, as shown in FIG. 16, a first catalyst state region I and a second catalyst state region II are defined in a region in which the temperature TC of the exhaust purification catalyst 13 can fall. In this case, the first catalyst state region I is a catalyst temperature region where the temperature TC of the exhaust purification catalyst 13 is higher than the limit temperature TX, while the second catalyst state region II is a catalyst temperature region where the temperature TC of the exhaust purification catalyst 13 is lower than the limit temperature TX. Based on this, the first $NO_X$ purification method is used when the temperature TX of the exhaust purification catalyst 13 falls in the first catalyst state region I, while the second $NO_X$ purification method is used when the temperature TC of the exhaust purification catalyst 13 falls in the second catalyst state region II.

Therefore, generally speaking, a first catalyst state region I and a second catalyst state region II are defined in a region in which an exhaust purification catalyst state can fall, and the first $NO_X$ purification method is used when the exhaust purification catalyst state falls in the first catalyst state region and the second $NO_X$ purification method is used when the exhaust purification catalyst state falls in the second catalyst state region. In the example which is shown in FIG. 16, the exhaust purification catalyst state is expressed by a temperature TC of the exhaust purification catalyst 13. Alternatively, it can be understood that the exhaust purification catalyst state is expressed by an $NO_X$ purification ratio when using the first $NO_X$ purification method and an $NO_X$ purification ratio when using the second $NO_X$ purification method, the first catalyst state region is a first $NO_X$ purification ratio region where the $NO_X$ purification ratio when using the first $NO_X$ purification method is higher than the $NO_X$ purification ratio when using the second $NO_X$ purification method, and the second catalyst state region is a second $NO_X$ purification ratio region where the $NO_X$ purification ratio when using the second $NO_X$ purification method is higher than the $NO_X$ purification ratio when using the first $NO_X$ purification method.

In this regard, as explained above, in the second $NO_X$ purification method, in order to make the exhaust purification catalyst 13 release the stored $NO_X$ to purify it, rich control, configured to inject additional fuel WR in addition to the fuel Q for combustion from the fuel injector 3 into a combustion chamber 2 to make the air-fuel ratio (A/F) in of the exhaust gas flowing into the exhaust purification catalyst 13 rich, is performed. In rich control of the embodiment according to the present invention, the additional fuel WR is injected in a state in which a throttle opening is made smaller to decrease an intake air amount. This reduces the amount of additional fuel required for making the air-fuel ratio (A/F) in of the exhaust gas rich.

Figure 17:
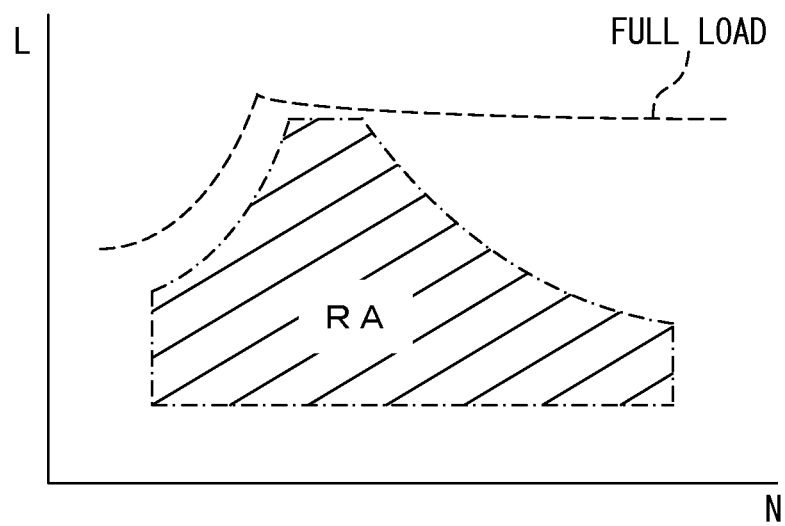
FIG. 17 is a map showing a rich control allowable region RA.

In this regard, if performing rich control when the engine load is considerably low or the engine speed is considerably low, misfire may occur. Further, if performing rich control when the engine load is considerably high or when the engine speed is considerably high, a large amount of smoke may be discharged. Therefore, in this embodiment according to the present invention, as shown in FIG. 17, a rich control allowable region RA in which performance of rich control is allowed is defined in advance, in an engine operating region expressed by the amount of depression L of the accelerator pedal 40 which represents the engine load and by the engine speed N. Based on this, when the engine operating state falls in the rich control allowable region RA, it is judged that a condition for performance of rich control stands and performance of rich control is allowed. As opposed to this, when the engine operating state does not fall in the rich control allowable region RA, it is judged that the condition for performance of rich control does not stand and performance of rich control is prohibited.

Now then, as explained with reference to FIG. 16, the first $NO_X$ purification method is used when the temperature TX of the exhaust purification catalyst 13 falls in the first catalyst state region I, while the second $NO_X$ purification method is used when the temperature TC of the exhaust purification catalyst 13 falls in the second catalyst state region II. In this regard, when the temperature TC of the exhaust purification catalyst 13 falls in the second catalyst state region II, if the condition for performing rich control does not stand for a long period of time, the stored $NO_X$ may not be released from the exhaust purification catalyst 13 and the $NO_X$ may be unable to be purified well.

On the other hand, such a problem does not arise when the temperature TC of the exhaust purification catalyst 13 falls in the first catalyst state region I and therefore the first $NO_X$ purification method is performed.

Therefore, in this embodiment according to the present invention, shift control configured to shift the region in which the temperature TC of the exhaust purification catalyst 13 falls from the second catalyst state region II to the first catalyst state region I is performed to thereby perform the first NO$_X$ purification method. This will be further explained with reference to FIG. 18.

Figure 18:
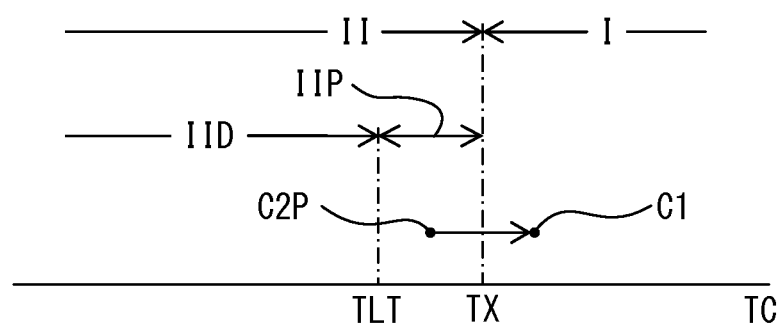
FIG. 18 is a graph for explaining an embodiment according to the present invention.

In the embodiment shown in FIG. 18, the second catalyst state region II is divided into a second proximal region IIP close to the first catalyst state region I and a second distal region IID far from the first catalyst state region I. The second proximal region IIP is a catalyst temperature region where the temperature TC of the exhaust purification catalyst 13 is higher than a lower threshold temperature TLT and lower than the limit temperature TX, while the second distal region IID is a catalyst temperature region where the temperature TC of the exhaust purification catalyst 13 is lower than the lower threshold temperature TLT. In the example shown in FIG. 18, the first catalyst state region I and the second catalyst state region II adjoin each other, so the second proximal region IIP adjoins the first catalyst state region I.

Based on this, when the temperature TC of the exhaust purification catalyst 13 falls in the second proximal region IIP, shift control configured to shift the region in which the exhaust purification catalyst temperature TC falls to the first catalyst state region I by increasing the temperature of the exhaust purification catalyst 13 is performed. That is, as shown in FIG. 18, the state of the exhaust purification catalyst 13 is shifted from the point C2P where it falls in the second proximal region IIP to the point C1 where it falls in the first catalyst state region I. As a result, the NO$_X$ purification method used is switched from the second NO$_X$ purification method to the first NO$_X$ purification method. Therefore, the NO$_X$ is more reliably purified. In this case, shift control is performed when the state of the exhaust purification catalyst 13 falls in the second proximal region IIP, so the region in which the exhaust purification catalyst 13 falls is easily shifted.

In the embodiment shown in FIG. 18, rich control is performed to increase the temperature of the exhaust purification catalyst 13. When rich control is performed, the temperature of the exhaust gas flowing into the exhaust purification catalyst 13 is made to increase by combustion of the additional fuel WR and, therefore, the temperature of the exhaust purification catalyst 13 increases. Further, if rich control is performed, the NO$_X$ stored in the exhaust purification catalyst 13 is released.

Note that, the rich control in this case is also performed when the condition for performing rich control stands as explained with reference to FIG. 17. In other words, shift control is performed when the condition for performing shift control determined in accordance with the engine operating state stands, while shift control is not performed when the condition for performing shift control does not stand.

In another embodiment, to increase the temperature of the exhaust purification catalyst 13, additional fuel is injected in addition to fuel for combustion into a combustion chamber 2 to make the air-fuel ratio of the exhaust gas (A/F) in flowing in to the exhaust purification catalyst 13 lean or the stoichiometric air-fuel ratio. In still another embodiment, the hydrocarbon feed valve 15 injects hydrocarbons so as to increase the temperature of the exhaust purification catalyst 13.

Further, in the embodiment shown in FIG. 18, the lower threshold temperature TLT is set to a temperature lower than the limit temperature TX by a predetermined temperature difference, for example 50° C. In another embodiment, the lower threshold temperature TLT is set to an NO$_X$ purification activation temperature of the exhaust purification catalyst 13. The NO$_X$ purification activation temperature of the exhaust purification catalyst 13 is the lowest temperature at which the exhaust purification catalyst 13 can purify NO$_X$ by the second NO$_X$ purification method using rich control and, for example, is 200 to 250° C.

Note that, in the embodiment shown in FIG. 18, the first NO$_X$ purification method is not performed while the temperature TC of the exhaust purification catalyst 13 continues to fall in the second catalyst state region II. Instead, the region in which the temperature TC of the exhaust purification catalyst 13 falls is shifted to the first catalyst state region I and thereby the first NO$_X$ purification method is performed.

Figure 19:
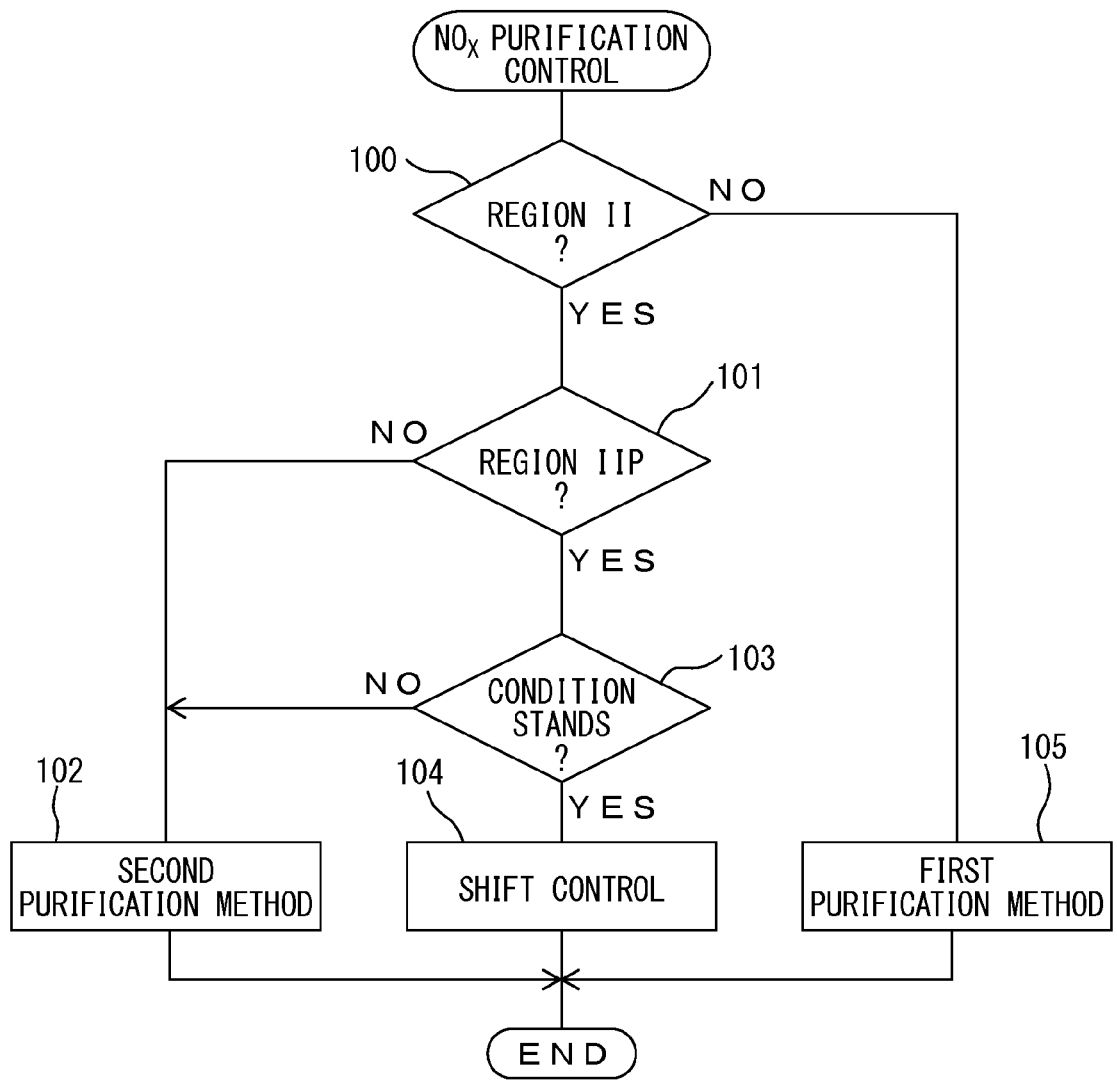
FIG. 19 is a flow chart for performing $NO_X$ purification control.
Figure 20:
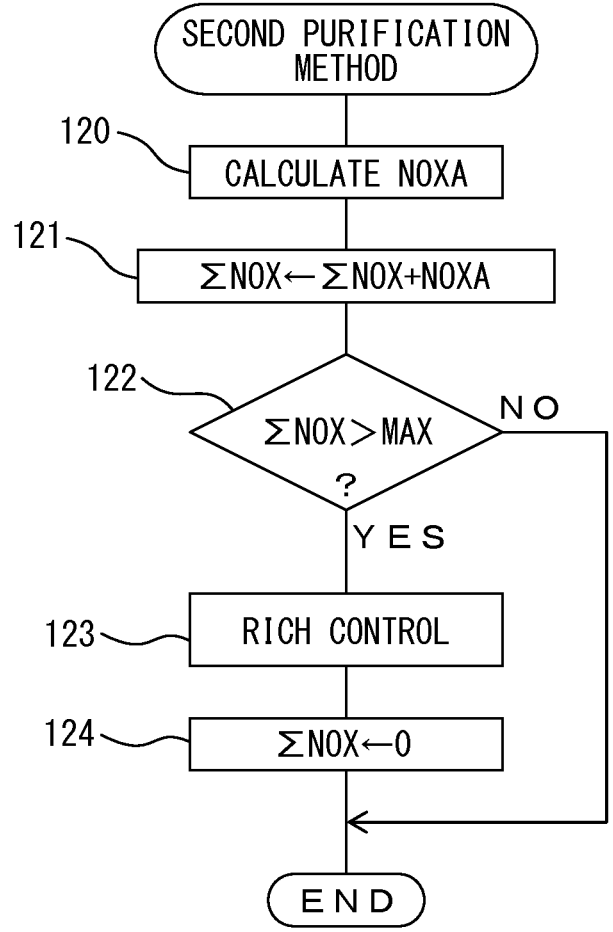
FIG. 20 is a flow chart for performing a second $NO_X$ purification method.
Figure 21:
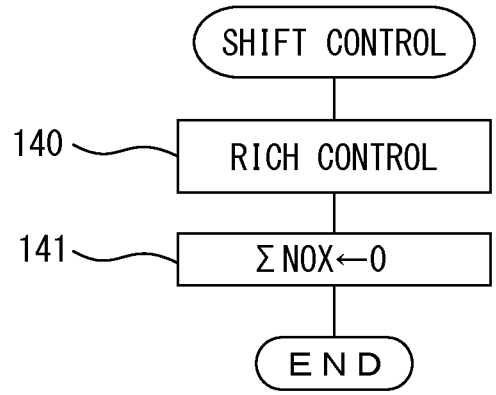
FIG. 21 is a flow chart for performing shift control.

FIG. 19 shows a routine for performing NO$_X$ purification control of the embodiment shown in FIG. 18. This routine is performed by interruption every certain time period. Referring to FIG. 19, first, at step 100, it is judged if the temperature TC of the exhaust purification catalyst 13 falls in the second catalyst state region II. If the temperature TC of the exhaust purification catalyst 13 falls in the second catalyst state region II, next the routine proceeds to step 101 where it is judged if the temperature TC of the exhaust purification catalyst 13 falls in the second proximal region IIP. If the temperature TC of the exhaust purification catalyst 13 does not fall in the second proximal region IIP, that is, if the temperature TC of the exhaust purification catalyst 13 falls in the second distal region IID, next the routine proceeds to step 102 where a routine for performing the second NO$_X$ purification method is performed. This routine is shown in FIG. 20. If the temperature TC of the exhaust purification catalyst 13 falls in the second proximal region IIP, the routine proceeds from step 101 to step 103 where it is judged if the condition for performing shift control stands, that is, the map of FIG. 17 is used to judge if the condition for performing rich control stands. If the condition for performing shift control stands, the routine proceeds to step 104 where a routine for performing shift control is performed. This routine is shown in FIG. 21. If the condition for performing shift control does not stand, the routine proceeds from step 103 to step 102 where the routine for performing the second NO$_X$ purification method is performed. If the temperature TC of the exhaust purification catalyst 13 does not fall in the second catalyst state region II, that is, if the temperature TC of the exhaust purification catalyst 13 falls in the first catalyst state region I, the routine proceeds from step 100 to step 105 where the first NO$_X$ purification method is performed. That is, the hydrocarbon feed valve 15 injects hydrocarbons of the injection amount W shown in FIG. 11 by an injection period ΔT set in advance according to the engine operating state.

FIG. 20 shows the routine for performing the second NO$_X$ purification method. Referring to FIG. 20, at step 120, the NO$_X$ amount NOXA discharged per unit time is calculated from the map shown in FIG. 13. Next, at step 121, the discharged NO$_X$ amount NOXA is added to ΣNOX to calculate the stored NO$_X$ amount ΣNOX. Next, at step 122, it is judged if the stored NO$_X$ amount exceeds the allowable value MAX. If ΣNOX>MAX, the routine proceeds to step 123 where rich control is performed. That is, the additional fuel amount WR is calculated from the map shown in FIG. 15. The injection action of the additional fuel is performed for, for example, a certain time period. Next, at step 124, ΣNOX is cleared.

Note that, as will be understood from FIG. 19, so long as the temperature TC of the exhaust purification catalyst 13 falls in the second proximal region IIP and the condition for performing shift control stands, shift control is repeatedly performed until the temperature TC of the exhaust purification catalyst 13 shifts to the first catalyst state region I.

FIG. 21 shows the routine for performing shift control. Referring to FIG. 21, at step 140, rich control is performed. Next, at step 141, ΣNOX is cleared.

Figure 22:
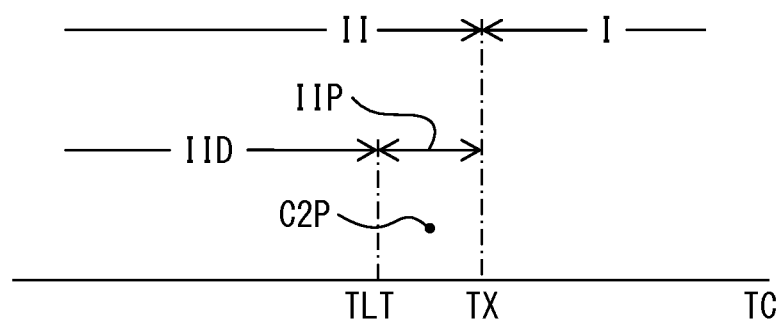
FIG. 22 is a graph for explaining another embodiment according to the present invention.

FIG. 22 shows another embodiment according to the present invention. In the embodiment shown in FIG. 22 as well, shift control is performed when the temperature TC of the exhaust purification catalyst 13 falls in the second proximal region IIP and, therefore the temperature of the exhaust purification catalyst 13 is made to increase. In this regard, for example, in a case where an engine operating state where the temperature of the exhaust gas flowing into the exhaust purification catalyst 13 is low is being performed, even if shift control is performed, the temperature of the exhaust purification catalyst 13 cannot be sufficiently made to increases, and the region in which the temperature TC of the exhaust purification catalyst 13 falls cannot be made to shift to the first catalyst state region I. If shift control, that is, rich control, is repeated in this case, the amount of fuel consumption ends up increasing.

Therefore, in the embodiment shown in FIG. 22, if it is difficult to make the region in which the temperature TC of the exhaust purification catalyst 13 falls shift to the first catalyst state region I, shift control is stopped. As a result, shift control, that is, rich control, is kept from being repeatedly performed and the fuel consumption amount is kept from increasing. In this case, as shown in FIG. 22, the state of the exhaust purification catalyst 13 is maintained at the point C2P falling in the second proximal region IIP. Alternatively, when the temperature TC of the exhaust purification catalyst 13 falls along with the elapse of time, the state of the exhaust purification catalyst 13 shifts to the second distal region IID.

In the embodiment shown in FIG. 22, when the number of times of shift control which was performed within a certain time period exceeds an allowable number, it is judged difficult to make the region in which the temperature TC of the exhaust purification catalyst 13 falls shift to the first catalyst state region I. Otherwise, it is judged that it is not difficult to make the region in which the temperature TC of the exhaust purification catalyst 13 falls shift to the first catalyst state region I. In another embodiment, when an average vehicle speed in a certain time period is lower than a threshold value, it is judged difficult to make the region in which the temperature TC of the exhaust purification catalyst 13 falls shift to the first catalyst state region I. In still another embodiment, when the engine is operated in a mode in which the engine is controlled to make a vehicle speed a target vehicle speed set by the vehicle operator, it is judged that it is difficult to make the region in which the temperature TC of the exhaust purification catalyst 13 falls shift to the first catalyst state region I.

Figure 23:
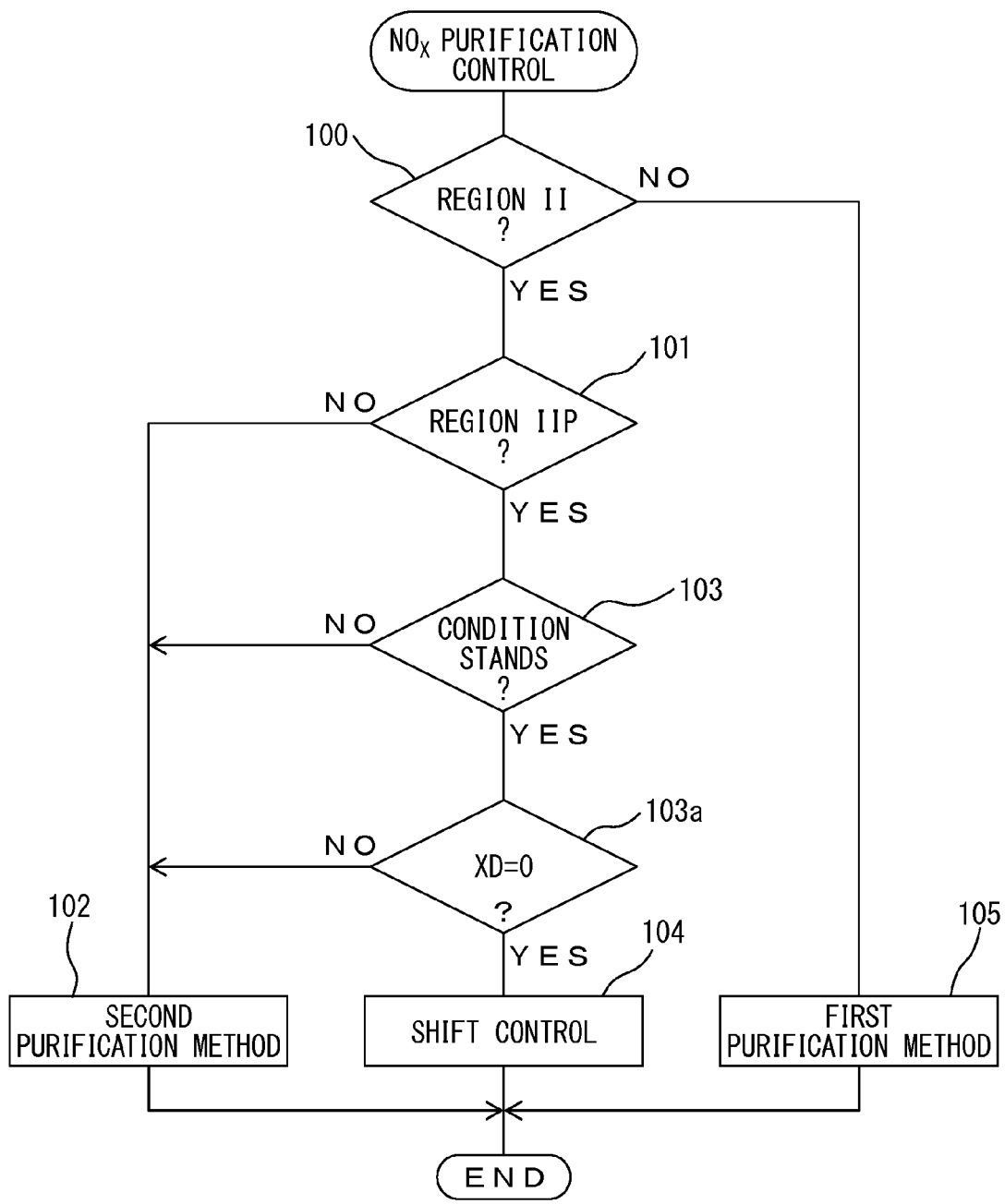
FIG. 23 is a flow chart for performing $NO_X$ purification control of the embodiment shown in FIG. 22.

FIG. 23 shows a routine for performing the $NO_X$ purification control of the embodiment shown in FIG. 22. This routine is performed by interruption every certain time period. Referring to FIG. 23, first, at step 100, it is judged if the temperature TC of the exhaust purification catalyst 13 falls in the second catalyst state region II. If the temperature TC of the exhaust purification catalyst 13 falls in the second catalyst state region II, next the routine proceeds to step 101 where it is judged if the temperature TC of the exhaust purification catalyst 13 falls in the second proximal region IIP. If the temperature TC of the exhaust purification catalyst 13 does not fall in the second proximal region IIP, that is, if the temperature TC of the exhaust purification catalyst 13 falls in the second distal region IID, next the routine proceeds to step 102 where the routine for performing the second $NO_X$ purification method is performed. This routine is shown in FIG. 20. If the temperature TC of the exhaust purification catalyst 13 falls in the second proximal region IIP, the routine proceeds from step 101 to step 103 where it is judged if the condition for performing shift control stands. If the condition for performing shift control stands, the routine proceeds to step 103a where it is judged if a flag XD has been reset. The flag XD is set (XD=1) when it is judged difficult to make the region in which the temperature TC of the exhaust purification catalyst 13 falls shift from the second proximal region IIP to the first catalyst state region I and is reset (XD=0) otherwise. The flag XD is controlled by a routine shown in FIG. 24. If the flag XD is set, that is, if it is difficult to make the region in which the temperature TC of the exhaust purification catalyst 13 falls shift, the routine proceeds to step 102 where the routine for performing the second $NO_X$ purification method is performed. Therefore, shift control is not performed. As opposed to this, if the flag XD is reset, that is, if it is not difficult to make the region in which the temperature TC of the exhaust purification catalyst 13 falls shift, the routine proceeds from step 103a to step 104 where the routine for performing shift control is performed. This routine is shown in FIG. 21. If the condition for performing shift control does not stand, the routine proceeds from step 103 to step 102 where the routine for performing the second $NO_X$ purification method is performed. If the temperature TC of the exhaust purification catalyst 13 does not fall in the second catalyst state region II, that is, if the temperature TC of the exhaust purification catalyst 13 falls in the first catalyst state region I, the routine proceeds from step 100 to step 105 where the first $NO_X$ purification method is performed.

Figure 24:
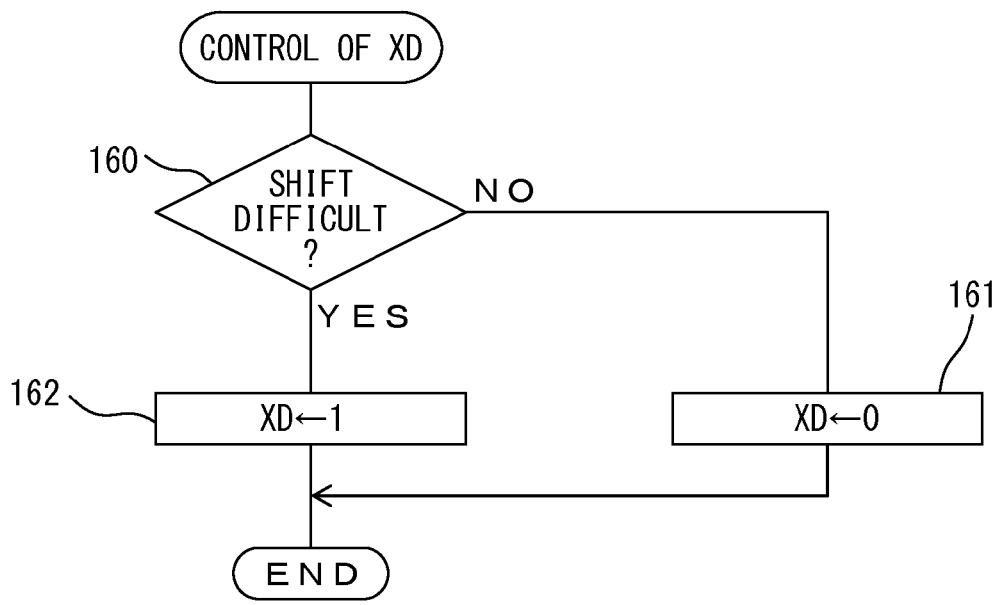
FIG. 24 is a flow chart for performing control of a flag XD.

FIG. 24 shows the routine for control of the flag XD. This routine is performed by interruption every certain time period. Referring to FIG. 24, first, at step 160, it is judged if it is difficult to make the region in which the temperature TC of the exhaust purification catalyst 13 falls shift to another catalyst state region. If it is not difficult to make the region in which the temperature TC of the exhaust purification catalyst 13 falls shift to another catalyst state region, next the routine proceeds to step 161 where the flag XD is reset (XD=0). As opposed to this, if it is difficult to make the region in which the temperature TC of the exhaust purification catalyst 13 falls shift to another catalyst state region, the routine proceeds to step 162 where the flag XD is set (XD=1).

Figure 25:
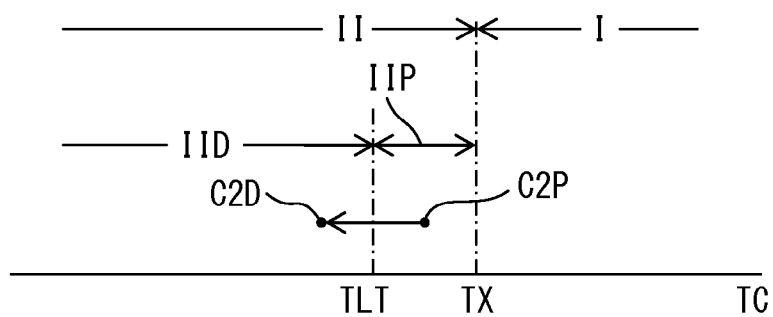
FIG. 25 is a graph for explaining still another embodiment according to the present invention.

FIG. 25 shows still another embodiment according to the present invention. In the embodiment shown in FIG. 25, if it is judged that it is difficult to make the region in which the temperature TC of the exhaust purification catalyst 13 falls shift to the first catalyst state region I, reverse shift control, configured to fall the temperature of the exhaust purification catalyst 13 to thereby make the region in which the temperature TC of the exhaust purification catalyst 13 falls shift from the second proximal region IIP to the second distal region IID, is performed. That is, as shown in FIG. 25, the state of the exhaust purification catalyst 13 is shifted from the point C2P falling in the second proximal region IIP to the point C2D falling in the second distal region IID. As a result, shift control is no longer performed.

In the internal combustion engine shown in FIG. 1, the fuel injection by the fuel injector 3 is temporarily stopped at the time of engine deceleration operation. Therefore, in the embodiment shown in FIG. 25, to fall the temperature of the exhaust purification catalyst 13, an amount of exhaust gas flowing through the exhaust purification catalyst 13 is increased while the fuel injection is stopped at the time of an engine deceleration operation. To increase the amount of exhaust gas, one or both of increase of a throttle opening degree and decrease of an opening degree of the EGR control valve 17 are performed. In an internal combustion engine provided with an exhaust throttle valve downstream of the exhaust purification catalyst 13, an opening degree of the exhaust throttle valve is increased to increase the amount of exhaust gas.

Figure 26:
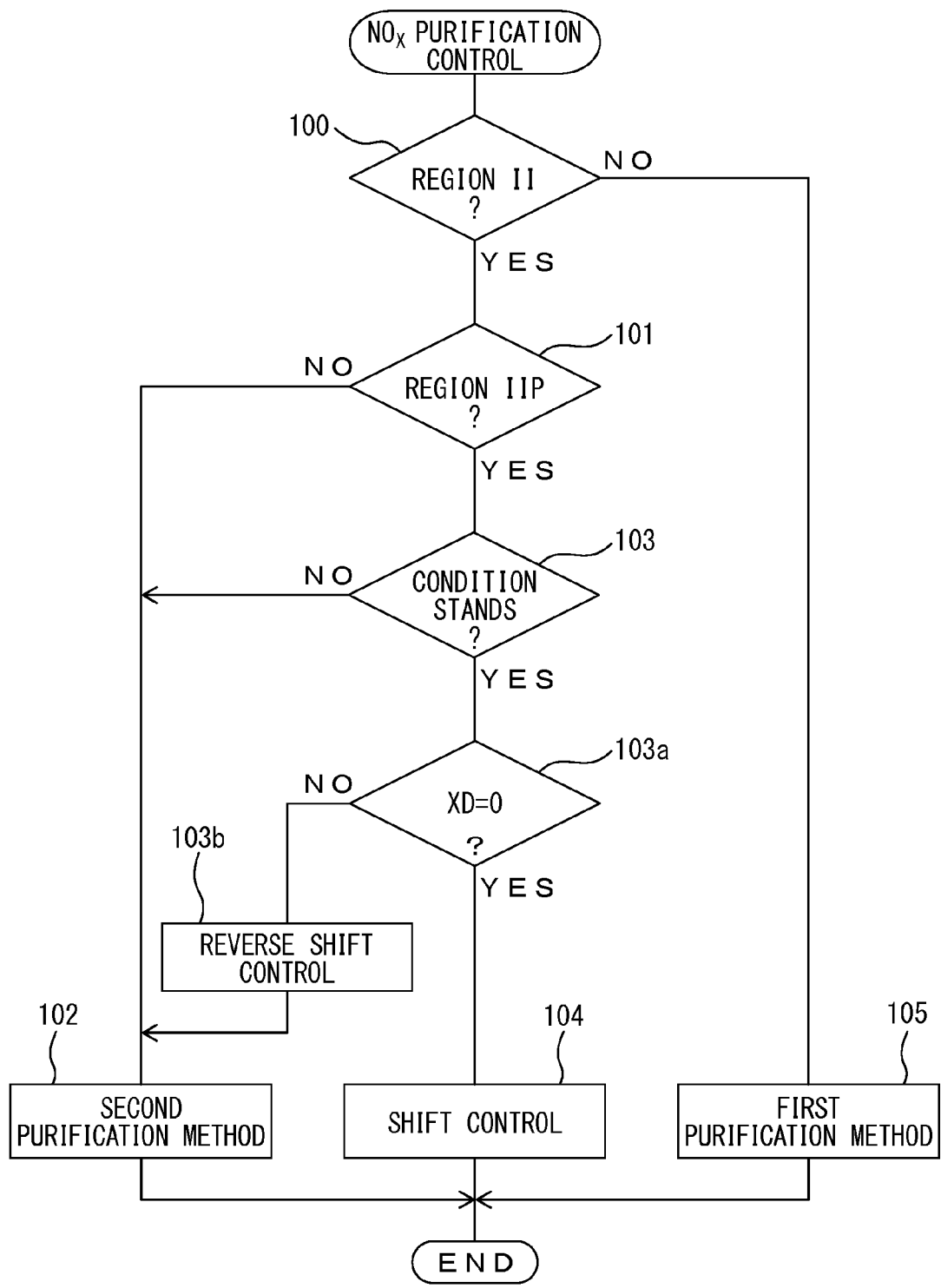
FIG. 26 is a flow chart for performing $NO_X$ purification control of the embodiment shown in FIG. 25.

FIG. 26 shows a routine for performing $NO_X$ purification control of the embodiment shown in FIG. 25. This routine is performed by interruption every certain time period. Referring to FIG. 26, first, at step 100, it is judged if the temperature TC of the exhaust purification catalyst 13 falls in the second catalyst state region II. If the temperature TC of the exhaust purification catalyst 13 falls in the second catalyst state region II, next the routine proceeds to step 101 where it is judged if the temperature TC of the exhaust purification catalyst 13 falls in the second proximal region IIP. If the temperature TC of the exhaust purification catalyst 13 does not fall in the second proximal region IIP, that is, if the temperature TC of the exhaust purification catalyst 13 falls in the second distal region IID, next the routine proceeds to step 102 where the routine for performing the second $NO_X$ purification method is performed. This routine is shown in FIG. 20. If the temperature TC of the exhaust purification catalyst 13 falls in the second proximal region IIP, the routine proceeds from step 101 to step 103 where it is judged if the condition for performing shift control stands. If the condition for performing shift control stands, the routine proceeds to step 103a where it is judged if a flag XD is reset. The flag XD is set (XD=1) when it is judged difficult to make the region in which the temperature TC of the exhaust purification catalyst 13 falls shift from the second proximal region IIP to the first catalyst state region I and is reset (XD=0) otherwise. The flag XD is controlled by the routine shown in FIG. 24. If the flag XD is set, that is, if the shift to the region in which the temperature TC of the exhaust purification catalyst 13 falls is difficult, the routine proceeds to step 103b where reverse shift control is performed. Next, the routine proceeds to step 102 where the routine for performing the second $NO_X$ purification method is performed. Therefore, shift control is not performed. As opposed to this, if the flag XD is reset, that is, if it is not difficult to make the region in which the temperature TC of the exhaust purification catalyst 13 falls shift, the routine proceeds from step 103a to step 104 where the routine for performing shift control is performed. This routine is shown in FIG. 21. If the condition for performing shift control does not stand, the routine proceeds from step 103 to step 102 where the routine for performing the second $NO_X$ purification method is performed. If the temperature TC of the exhaust purification catalyst 13 does not fall in the second catalyst state region II, that is, if the temperature TC of the exhaust purification catalyst 13 falls in the first catalyst state region I, the routine proceeds from step 100 to step 105 where the first $NO_X$ purification method is performed.

Figure 27:
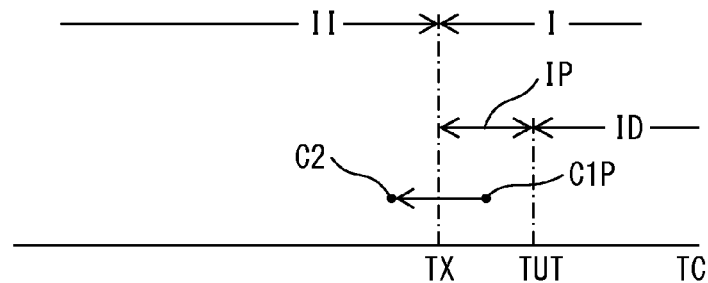
FIG. 27 is a graph for explaining still another embodiment according to the present invention.

FIG. 27 shows still another embodiment according to the present invention. In the embodiment shown in FIG. 27, the first catalyst state region I is divided into a first proximal region IP close to the second catalyst state region II and a first distal region ID far from the second catalyst state region II. The first proximal region IP is a catalyst temperature region where the temperature TC of the exhaust purification catalyst 13 is higher than the limit temperature TX and lower than an upper threshold temperature TUT, while the first distal region ID is a catalyst temperature region where the temperature TC of the exhaust purification catalyst 13 is higher than the upper threshold temperature TUT. In the example shown in FIG. 27, the first catalyst state region I and the second catalyst state region II adjoin each other, so the first proximal region IP adjoins the second catalyst state region II.

Based on this, when the temperature TC of the exhaust purification catalyst 13 falls in the first proximal region IP, shift control configured to shift the region in which the exhaust purification catalyst temperature TC falls to the second catalyst state region II by falling the temperature of the exhaust purification catalyst 13. That is, as shown in FIG. 27, the state of the exhaust purification catalyst 13 is shifted from the point C1P falling in the first proximal region IP to the point C2 falling in the second catalyst state region II. As a result, the second $NO_X$ purification method is performed. In this case, shift control is performed when the state of the exhaust purification catalyst 13 falls in the first proximal region IP, so the region in which the exhaust purification catalyst 13 falls is easily shifted.

The amount of exhaust gas flowing through the exhaust purification catalyst 13 is increased to fall the temperature of the exhaust purification catalyst 13. This shift control, that is, exhaust gas increase control, is performed during stoppage of fuel injection at the time of engine deceleration operation and is not performed otherwise.

Furthermore, in the embodiment shown in FIG. 27, the upper threshold temperature TUT is set to a temperature higher than the limit temperature TX by a predetermined temperature difference, for example, 50° C.

Figure 28:
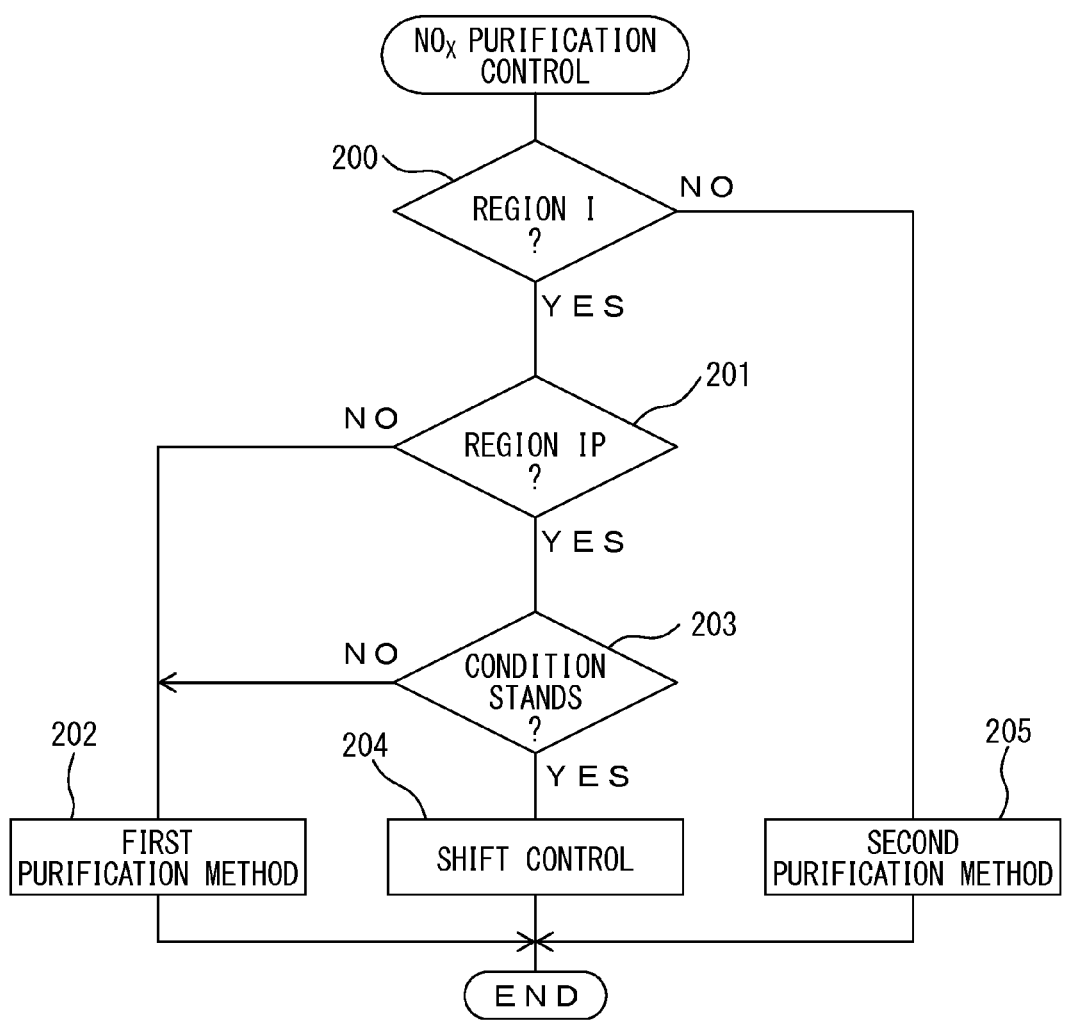
FIG. 28 is a flow chart for performing $NO_X$ purification control of the embodiment shown in FIG. 27.

FIG. 28 shows a routine for performing the $NO_X$ purification control of the embodiment shown in FIG. 27. This routine is performed by interruption every certain time period. Referring to FIG. 28, first, at step 200, it is judged if the temperature TC of the exhaust purification catalyst 13 falls in the first catalyst state region I. If the temperature TC of the exhaust purification catalyst 13 falls in the first catalyst state region I, next, the routine proceeds to step 201 where it is judged if the temperature TC of the exhaust purification catalyst 13 falls in the first proximal region IP. If the temperature TC of the exhaust purification catalyst 13 does not fall in the first proximal region IP, that is, if the temperature TC of the exhaust purification catalyst 13 falls in the first distal region ID, next the routine proceeds to step 202 where the first $NO_X$ purification method is performed. If the temperature TC of the exhaust purification catalyst 13 falls in the first proximal region IP, the routine proceeds from step 201 to step 203 where it is judged if the condition for performing shift control stands. If the condition for performing shift control stands, the routine proceeds to step 204 where shift control is performed. That is, the temperature of the exhaust purification catalyst 13 is made to fall. If the condition for performing shift control does not stand, the routine proceeds from step 203 to step 202 where the routine for performing the first $NO_X$ purification method is performed. If the temperature TC of the exhaust purification catalyst 13 does not fall in the first catalyst state region I, that is, if the temperature TC of the exhaust purification catalyst 13 falls in the second catalyst state region II, the routine proceeds from step 200 to step 205 where the routine for performing the second $NO_X$ purification method is performed. This routine is shown in FIG. 20.

Figure 29:
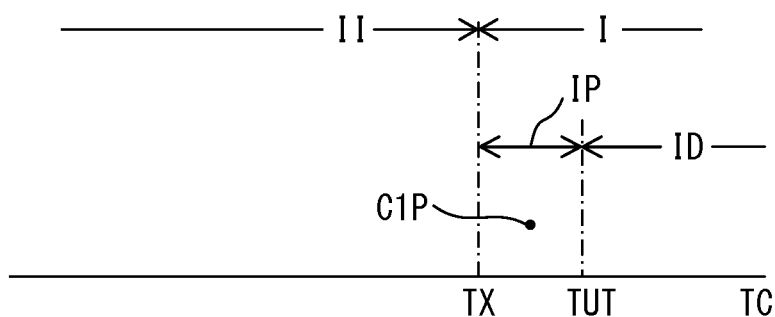
FIG. 29 is a graph for explaining still another embodiment according to the present invention.

FIG. 29 shows still another embodiment according to the present invention. In the embodiment shown in FIG. 29, when it is difficult to make the region in which the temperature TC of the exhaust purification catalyst 13 falls shift to the second catalyst state region II, the shift control is stopped. As a result, shift control is prevented from being repeatedly performed. In this case, as shown in FIG. 29, the state of the exhaust purification catalyst 13 is maintained at the point C1P falling in the first proximal region IP. Alternatively, if the temperature TC of the exhaust purification catalyst 13 increases along with the elapse of time, the state of the exhaust purification catalyst 13 shifts to the first distal region I.

In the embodiment shown in FIG. 29, when the number of times of shift control performed within a certain time period exceeds an allowable number, it is judged difficult to make the region in which the temperature TC of the exhaust purification catalyst 13 falls shift to the second catalyst state region II, while otherwise, it is judged not difficult to make the region in which the temperature TC of the exhaust purification catalyst 13 falls shift to the second catalyst state region II. In another embodiment, when an average vehicle speed in a certain time period is higher than a threshold value, it is judged difficult to make the region in which the temperature TC of the exhaust purification catalyst 13 falls shift to the second catalyst state region II.

Figure 30:
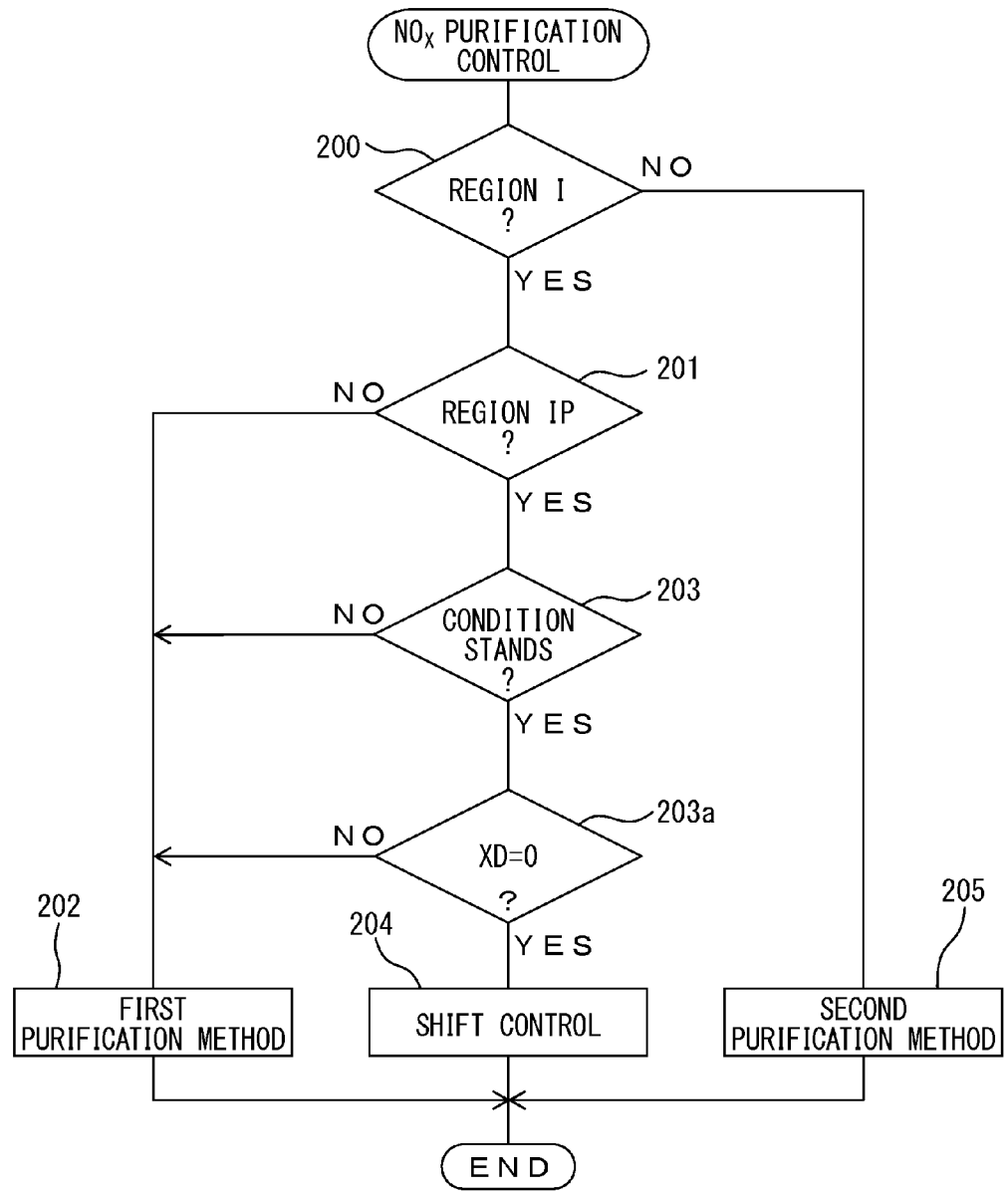
FIG. 30 is a flow chart for performing $NO_X$ purification control of the embodiment shown in FIG. 29.

FIG. 30 shows a routine for performing $NO_X$ purification control of the embodiment shown in FIG. 29. This routine is performed by interruption every certain time period. Referring to FIG. 30, first, at step 200, it is judged if the temperature TC of the exhaust purification catalyst 13 falls in the first catalyst state region I. If the temperature TC of the exhaust purification catalyst 13 falls in the first catalyst state region I, next, the routine proceeds to step 201 where it is judged if the temperature TC of the exhaust purification catalyst 13 falls in the first proximal region IP. If the temperature TC of the exhaust purification catalyst 13 does not fall in the first proximal region IP, that is, if the temperature TC of the exhaust purification catalyst 13 falls in the first distal region ID, next the routine proceeds to step 202 where the first $NO_X$ purification method is performed. If the temperature TC of the exhaust purification catalyst 13 falls in the first proximal region IP, the routine proceeds from step 201 to step 203 where it is judged if the condition for performing shift control stands. If the condition for performing shift control stands, the routine proceeds to step 203a where it is judged if a flag XD has been reset. The flag XD is set (XD=1) when it is judged that it is difficult to make the region in which the temperature TC of the exhaust purification catalyst 13 falls shift from the first proximal region IP to the second catalyst state region II and is reset (XD=0) otherwise. The flag XD is controlled by the routine shown in FIG. 24. If the flag XD is set, that is, if it is difficult to make the region in which the temperature TC of the exhaust purification catalyst 13 falls shift, the routine proceeds to step 202 where the first $NO_X$ purification method is performed. Therefore, shift control is not performed. As opposed to this, if the flag XD is reset, that is, if it is difficult to make the region in which the temperature TC of the exhaust purification catalyst 13 falls shift, the routine proceeds from step 203a to step 204 where shift control is performed. That is, the temperature of the exhaust purification catalyst 13 is made to fall. If the condition for performing shift control does not stand, the routine proceeds from step 203 to step 202 where the first $NO_X$ purification method is performed. If the temperature TC of the exhaust purification catalyst 13 does not fall in the first catalyst state region I, that is, if the temperature TC of the exhaust purification catalyst 13 falls in the second catalyst state region II, the routine proceeds from step 200 to step 205 where the routine for performing the second $NO_X$ purification method is performed. This routine is shown in FIG. 20.

Figure 31:
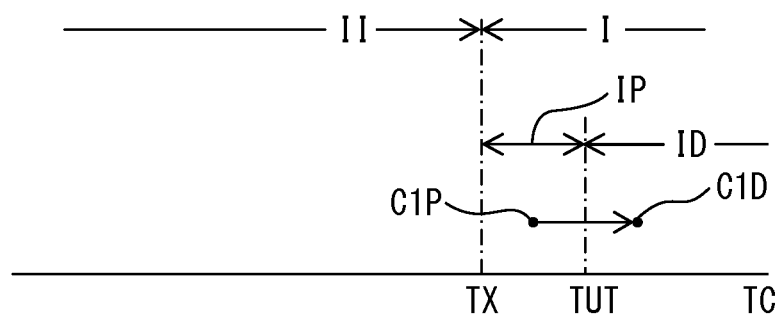
FIG. 31 is a graph for explaining another embodiment according to the present invention.

FIG. 31 shows still another embodiment according to the present invention. In the embodiment shown in FIG. 31, if it is judged that it is difficult to make the region in which the temperature TC of the exhaust purification catalyst 13 falls shift to the second catalyst state region II, reverse shift control, configured to increase the temperature of the exhaust purification catalyst 13 to thereby make the region in which the temperature TC of the exhaust purification catalyst 13 falls shift from the first proximal region IP to the first distal region ID. That is, as shown in FIG. 31, the state of the exhaust purification catalyst 13 is made to shift from the point C1P falling in the first proximal region IP to the point C1D where it falls in the first distal region ID. As a result, shift control is no longer performed.

In this example, rich control is performed when the condition for performing rich control stands in order to rise the temperature of the exhaust purification catalyst 13, in the same way as the embodiment shown in FIG. 18.

Figure 32:
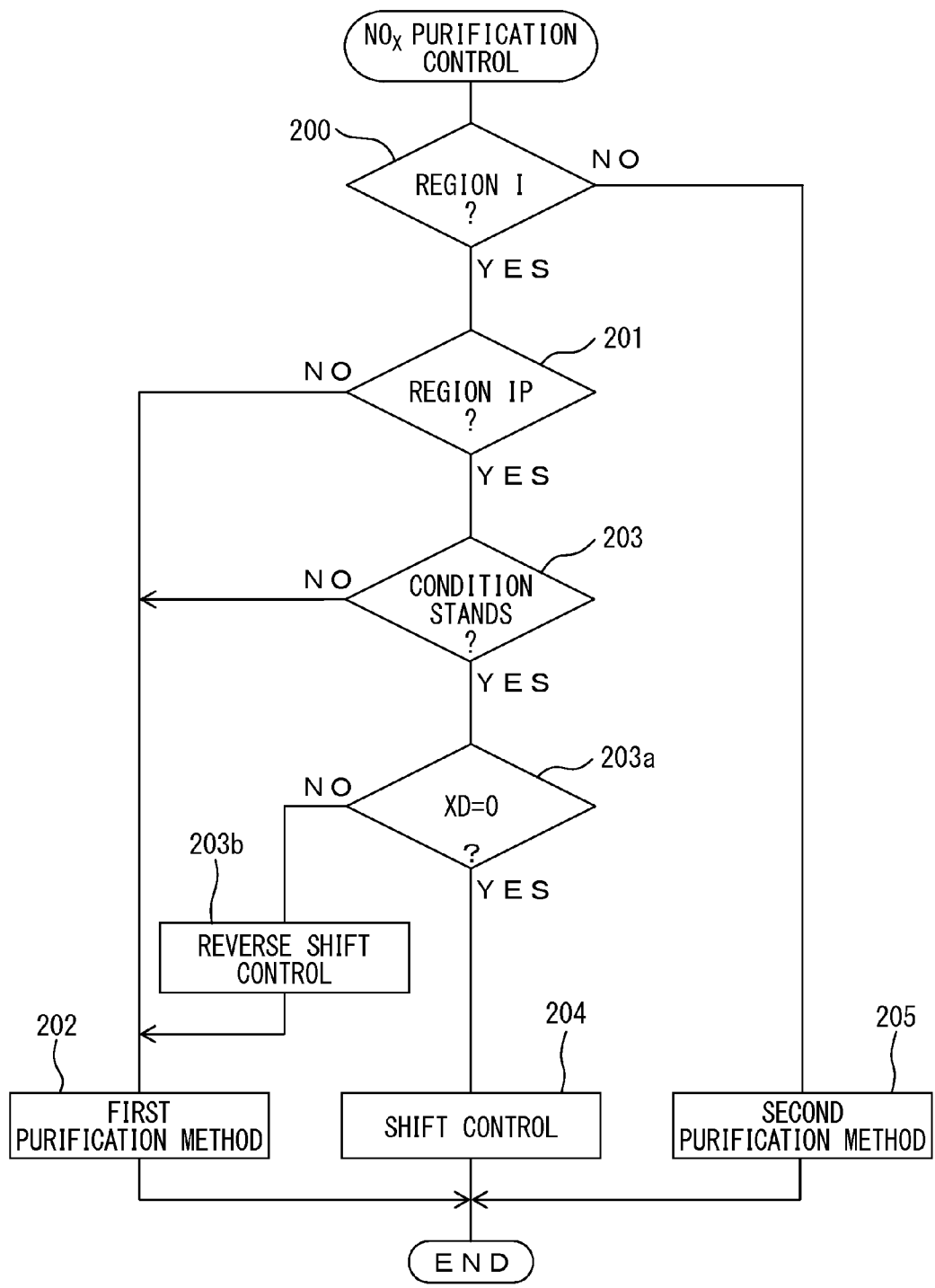
FIG. 32 is a flow chart for performing $NO_X$ purification control of the embodiment shown in FIG. 31.

FIG. 32 shows a routine for performing $NO_X$ purification control of the embodiment shown in FIG. 31. This routine is performed by interruption every certain time period. Referring to FIG. 32, first, at step 200, it is judged if the temperature TC of the exhaust purification catalyst 13 falls in the first catalyst state region I. If the temperature TC of the exhaust purification catalyst 13 falls in the first catalyst state region I, next, the routine proceeds to step 201 where it is judged if the temperature TC of the exhaust purification catalyst 13 falls in the first proximal region IP. If the temperature TC of the exhaust purification catalyst 13 does not fall in the first proximal region IP, that is, if the temperature TC of the exhaust purification catalyst 13 falls in the first distal region ID, next the routine proceeds to step 202 where the first $NO_X$ purification method is performed. If the temperature TC of the exhaust purification catalyst 13 falls in the first proximal region IP, the routine proceeds from step 201 to step 203 where it is judged if the condition for performing shift control stands. If the condition for performing shift control stands, the routine proceeds to step 203a where it is judged if a flag XD has been reset. The flag XD is set (XD=1) when it is judged that it is difficult to make the region in which the temperature TC of the exhaust purification catalyst 13 falls shift from the first proximal region IP to the second catalyst state region II, while it is reset (XD=0) otherwise. The flag XD is controlled by the routine shown in FIG. 24. If the flag XD is set, that is, if it is difficult to make the region in which the temperature TC of the exhaust purification catalyst 13 falls shift, the routine proceeds to step 203b where reverse shift control is performed. That is, the temperature of the exhaust purification catalyst 13 is made to increase. Next, the routine proceeds to step 202 where the first $NO_X$ purification method is performed. Therefore, shift control is not performed. As opposed to this, if the flag XD is reset, that is, if it is not difficult to make the region in which the temperature TC of the exhaust purification catalyst 13 falls shift, the routine proceeds from step 203a to step 204 where shift control is performed. That is, the temperature of the exhaust purification catalyst 13 is made to fall. If the condition for performing shift control does not stand, the routine proceeds from step 203 to step 202 where the first $NO_X$ purification method is performed. If the temperature TC of the exhaust purification catalyst 13 does not fall in the first catalyst state region I, that is, if the temperature TC of the exhaust purification catalyst 13 falls in the second catalyst state region II, the routine proceeds from step 200 to step 205 where the routine for performing the second $NO_X$ purification method is performed. This routine is shown in FIG. 20.

Figure 33:
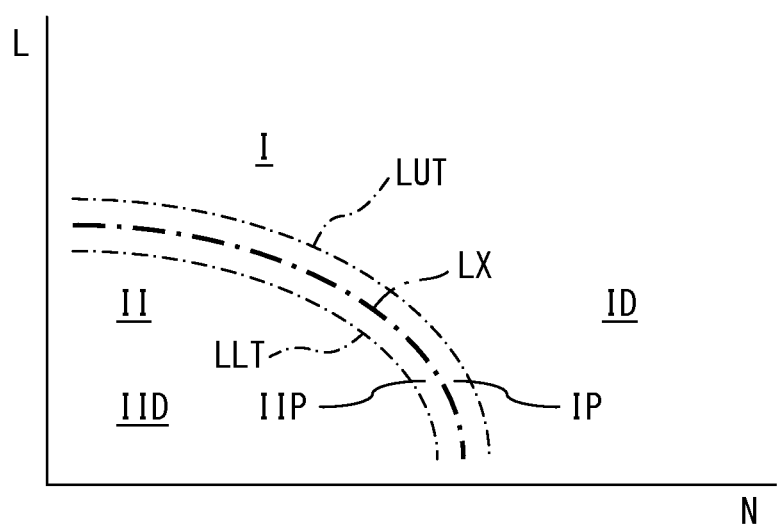
FIG. 33 is a graph showing a first catalyst state region and a second catalyst state region in still another embodiment according to the present invention.

In the embodiments according to the present invention explained up to here, the exhaust purification catalyst state is expressed by the temperature of the exhaust purification catalyst 13. In another embodiment, the exhaust purification catalyst state is expressed by an engine load. That is, as shown in FIG. 33, the first catalyst state region I is a first load region where an amount of depression L of the accelerator pedal 40 is larger than a limit amount LX, while the second catalyst state region II is a second load region where an amount of depression L of the accelerator pedal 40 is smaller than the limit amount LX. As will be understood from FIG. 33, the limit amount LX is determined according to the engine speed N, that is, becomes smaller the higher the engine speed N. Further, in the example shown in FIG. 33 as well, the second catalyst state region II is divided into a second proximal region IIP close to the first catalyst state region I and a second distal region IID far from the first catalyst state region I. The second proximal region IIP is a load region where an amount of depression L is larger than a lower threshold amount LLT and is smaller than the limit amount LX, while the second distal region IID is a load region where an amount of depression L is smaller than the lower threshold amount LLT. Similarly, the first catalyst state region I is divided into a first proximal region IP close to the second catalyst state region II and a first distal region ID far from the second catalyst state region II. The first proximal region IP is a load region where an amount of depression L is larger than the limit amount LX and is smaller than an upper threshold amount LUT, while the first distal region ID is a load region where an amount of depression L is larger than the upper threshold amount LUT.

Further, in the embodiments according to the present invention discussed up to here, the first catalyst state region I and the second catalyst state region II adjoin each other. Therefore, the second proximal region IIP adjoins the first catalyst state region I, while the first proximal region IP adjoins the second catalyst state region II. In another embodiment, the first catalyst state region I and the second catalyst state region II are separated from each other. In this case, the second proximal region IIP is separated from the first catalyst state region I, while the first proximal region IP is separated from the second catalyst state region II.

Note that, as another embodiment, it is also possible to arrange an oxidation catalyst for reforming the hydrocarbons upstream of the exhaust purification catalyst 13 in the engine exhaust passage.

REFERENCE SIGNS LIST

4. intake manifold
5. exhaust manifold
12a, 12b. exhaust pipe
13. exhaust purification catalyst
15. hydrocarbon feed valve
24. temperature sensor

The invention claimed is:

1. An exhaust purification system for an internal combustion engine, the exhaust purification system comprising:
    an engine exhaust passage;
    an exhaust purification catalyst arranged in the engine exhaust passage;
    a hydrocarbon feed valve arranged upstream of the exhaust purification catalyst in the engine exhaust passage;
    a precious metal catalyst that is carried on an exhaust gas flow surface of the exhaust purification catalyst and basic exhaust gas flow surface parts are formed around the precious metal catalyst; and
    an electronic control unit programmed to:
        selectively perform a first $NO_X$ purification method and a second $NO_X$ purification method, different from the first $NO_X$ purification method,
        when performing the first $NO_X$ purification method, control a vibration of a concentration of hydrocarbons flowing into the exhaust purification catalyst within a predetermined range of amplitude and within a predetermined range of period, and inject hydrocarbons into the exhaust gas passage via the hydrocarbon feed valve within the predetermined range of period, and
        when performing the second $NO_X$ purification method, control the vibration of the concentration of hydrocarbons flowing into the exhaust purification catalyst longer than the predetermined range of the first $NO_X$ purification method, such that there is an increase in a storage amount of $NO_X$ contained in the exhaust gas catalyst compared to the first method, and cause an air-fuel ratio of the exhaust gas flowing into the exhaust purification catalyst to become rich, such that the exhaust purification catalyst releases the stored $NO_X$, wherein
        a state of the exhaust purification catalyst is defined by a region, the region being divided into at least a first catalyst state region and a second catalyst state region, the second catalyst state region being different from the first region,
        the first $NO_X$ purification method is used when the exhaust purification catalyst state is in the first catalyst state region and the second $NO_X$ purification method is used when the exhaust purification catalyst state is in the second catalyst state region,
        the first catalyst state region and the second catalyst state region are respectively divided into proximal regions close to the other catalyst state regions and distal regions far from the other catalyst state regions, and that, when the exhaust purification catalyst state is in the proximal region of one catalyst state region, the electronic control unit is programmed to shift the region in which the exhaust purification catalyst state is in to the other catalyst state region, to thereby switch the $NO_X$ purification method used from the first $NO_X$ purification method to the second $NO_X$ purification method or from the second $NO_X$ purification method to the first $NO_X$ purification method.

2. The exhaust purification system for an internal combustion engine according to claim 1, wherein the exhaust purification catalyst state is defined by a temperature region of the exhaust purification catalyst, and wherein the first catalyst state region is a catalyst temperature region where the temperature of the exhaust purification catalyst is higher than a limit temperature, and the second catalyst state region is a catalyst temperature region where the temperature of the exhaust purification catalyst is lower than the limit temperature.

3. The exhaust purification system for an internal combustion engine according to claim 2, wherein, when the exhaust purification catalyst state is in the proximal region of the second catalyst state region, the electronic control unit is programmed to cause the temperature of the exhaust purification catalyst to increase to shift the region in which the exhaust purification catalyst state is in to the first catalyst state region and thereby make the first $NO_X$ purification method be used.

4. The exhaust purification system for an internal combustion engine according to claim 3, wherein the electronic control unit is programmed to perform rich control to inject additional fuel in addition to fuel for combustion in a combustion chamber to make the air-fuel ratio of the exhaust gas flowing into the exhaust purification catalyst rich in order to make the temperature of the exhaust purification catalyst increase.

5. The exhaust purification system for an internal combustion engine according to claim 3, wherein the second proximal region is a catalyst temperature region where the temperature of the exhaust purification catalyst is higher than a lower threshold temperature and lower than the limit temperature, and wherein the lower threshold temperature is set to a temperature lower than the limit temperature by a predetermined temperature difference.

6. The exhaust purification system for an internal combustion engine according to claim 2, wherein, when the exhaust purification catalyst state is in the proximal region of the first catalyst state region, the electronic control unit is programmed to cause the temperature of the exhaust purification catalyst to shift to the region in which the exhaust purification catalyst state is in to the second catalyst state region, and thereby cause the second $NO_X$ purification method to be used.

7. The exhaust purification system for an internal combustion engine according to claim 6, wherein the electronic control unit is programmed to cause an amount of exhaust gas flowing through the exhaust purification catalyst to increase during stoppage of fuel injection at a time of engine deceleration operation, in order to cause the temperature of the exhaust purification catalyst to fall.

8. The exhaust purification system for an internal combustion engine according to claim 7, wherein the first proximal region is a catalyst temperature region where the temperature of the exhaust purification catalyst is higher than the limit temperature and lower than an upper threshold temperature, and wherein the upper threshold temperature is set to a temperature higher than the limit temperature by a predetermined temperature difference.

9. The exhaust purification system for an internal combustion engine according to claim 1, wherein the exhaust purification catalyst state is defined by a $NO_X$ purification ratio region, wherein the first catalyst state region is a first $NO_X$ purification ratio region where the $NO_X$ purification ratio when using the first $NO_X$ purification method is higher than the $NO_X$ purification ratio when using the second $NO_X$ purification method, and wherein the second catalyst state region is a second $NO_X$ purification ratio region where the $NO_X$ purification ratio when using the second $NO_X$ purification method is higher than the $NO_X$ purification ratio when using the first $NO_X$ purification method.

10. The exhaust purification system for an internal combustion engine according to claim 1, wherein the exhaust purification catalyst state is defined by an engine load region, wherein the first catalyst state region is a first load region where the engine load is higher than a limit load, and wherein the second catalyst state region is a second load region where the engine load is lower than the limit load.

11. The exhaust purification system for an internal combustion engine according to claim 1, wherein the electronic control unit is programmed to stop shift control if it is difficult to make the region in which the exhaust purification catalyst state is shift to the other catalyst state region by shift control.

12. The exhaust purification system for an internal combustion engine according to claim 1, wherein the electronic control unit is programmed to cause the region in which the exhaust purification catalyst state is in to shift to the distal region of the one catalyst state region if it is difficult to make the region in which the exhaust purification catalyst state is in shift to the other catalyst state region by shift control.

13. The exhaust purification system for an internal combustion engine according to claim 1, wherein, when the exhaust purification catalyst state is in the proximal region of one catalyst state region, the electronic control unit is programmed to perform shift control if a condition for performing shift control, which is determined in accordance with an engine operating state, stands, and the electronic control unit programmed to not perform shift control if the condition for performing shift control does not stand.

14. The exhaust purification system for an internal combustion engine according to claim 1, wherein the first catalyst state region and the second catalyst state region adjoin each other.

* * * * *